(12) United States Patent
Wang

(10) Patent No.: US 11,990,974 B2
(45) Date of Patent: May 21, 2024

(54) TECHNIQUE FOR BEAM FAILURE DETECTION

(71) Applicant: Telefonaktiebolaget LM Ericsson (publ), Stockholm (SE)

(72) Inventor: Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 25 days.

(21) Appl. No.: 17/922,046

(22) PCT Filed: May 11, 2021

(86) PCT No.: PCT/EP2021/062506
§ 371 (c)(1),
(2) Date: Oct. 28, 2022

(87) PCT Pub. No.: WO2021/228869
PCT Pub. Date: Nov. 18, 2021

(65) Prior Publication Data
US 2023/0170968 A1    Jun. 1, 2023

Related U.S. Application Data

(60) Provisional application No. 63/024,964, filed on May 14, 2020.

(51) Int. Cl.
*H04B 7/06* (2006.01)
*H04B 7/08* (2006.01)
(Continued)

(52) U.S. Cl.
CPC ........... *H04B 7/0695* (2013.01); *H04B 7/088* (2013.01); *H04W 74/0833* (2013.01); *H04W 76/18* (2018.02)

(58) Field of Classification Search
CPC . H04B 7/0695; H04B 7/088; H04W 74/0833; H04W 76/18; H04W 16/28;
(Continued)

(56) References Cited

U.S. PATENT DOCUMENTS 11,743,879 B2 *   8/2023   Kwon .................... H04L 5/0096
                                                     370/329
2018/0191422 A1   7/2018   Xia et al.
(Continued)

FOREIGN PATENT DOCUMENTS

EP         3758428 A1      12/2020
WO      2019226014 A1      11/2019

OTHER PUBLICATIONS

Intel Corporation, "New SID: Study on supporting NR from 52.6GHz to 71 Ghz", 3GPP TSG RAN Meeting #86, Sitges, Spain, Dec. 9, 2019, pp. 1-3, RP-193259, 3GPP.
(Continued)

*Primary Examiner* — Sung S Ahn
(74) *Attorney, Agent, or Firm* — COATS & BENNETT, PLLC

(57) ABSTRACT

A technique for performing beam failure detection, BFD, of a radio beam between a radio device (100) and a radio access node (200) in a radio access network, RAN (600), is described. As to a method aspect of the technique performed by the radio device (100), a control message is received from the RAN (600). The control message is indicative of a spatial relation between a first physical channel (602) and a second physical channel (608). A transmission or a transmission attempt to the radio access node (200) is monitored on the second physical channel (608). The transmission or transmission attempt uses a filter (604) in the spatial domain (506), which is used or configured for a transmission (302) to the radio access node (200) or a reception (302) from the radio access node (200) on the first physical channel (602)

(Continued)

according to the spatial relation. The BFD is performed based on a result of the monitoring.

26 Claims, 11 Drawing Sheets

(51) Int. Cl.
    *H04W 74/0833*    (2024.01)
    *H04W 76/18*    (2018.01)

(58) Field of Classification Search
    CPC .... H04W 24/10; H04W 76/19; H04L 1/0026; H04L 1/1671
    See application file for complete search history.

(56) References Cited

U.S. PATENT DOCUMENTS

2019/0297648 A1     9/2019   Nagaraja et al.
2019/0394082 A1*   12/2019   Cirik ..................... H04W 76/28

OTHER PUBLICATIONS

3rd Generation Partnership Project, "3rd Generation Partnership Project; Technical Specification Group Radio Access Network; NR; Physical layer procedures for control (Release 16)", Technical Specification, 3GPP TS 38.213 V16.1.0, Mar. 1, 2020, pp. 1-156, 3GPP.

3rd Generation Partnership Project, "3rd Generation Partnership Project; Technical Specification Group Radio Access Network; NR; Medium Access Control (MAC) protocol specification (Release 16)", Technical Specification, 3GPP TS 38.321 V16.0.0, Mar. 1, 2020, pp. 1-141, 3GPP.

3rd Generation Partnership Project, "3rd Generation Partnership Project; Technical Specification Group Radio Access Network; NR; Requirements for support of radio resource management (Release 16)", Technical Specification, 3GPP TS 38.133 V16.3.0, Mar. 1, 2020, pp. 1-31, 3GPP.

Sharetechnote, "5G/NR—QCL (Quasi Co Location) / TCI (Transmission Configuration Indication)", pp. 1-11, retrieved on Sep. 1, 2022, retrieved from internet: http://www.sharetechnote.com/html/5G/5G_QCL.html#How_UE_figure_out_TCI_State_PDSCH.

* cited by examiner

800

900

TECHNIQUE FOR BEAM FAILURE DETECTION

TECHNICAL FIELD

The present disclosure relates to beam failure detection. More specifically, and without limitation, methods and devices for performing and supporting a beam failure detection are provided.

BACKGROUND

Mobile broadband will continue to drive the demands for higher overall traffic capacity and higher achievable end-user data rates in the wireless access network. Several scenarios in the future will require data rates of up to 10 Gbps in local areas. These demands for very high system capacity and very high end-user date rates can be met by networks with distances between access nodes ranging from a few meters in indoor deployments up to roughly 50 m in outdoor deployments, i.e. with an infra-structure density considerably higher than the densest networks of today. The wide transmission bandwidths needed to provide data rates up to 10 Gbps and above can likely only be obtained from spectrum allocations in the millimeter-wave band. High-gain beamforming, typically realized with array antennas, can be used to mitigate the increased pathloss at higher frequencies. Such networks are referred to as New Radio (NR) systems in the following.

In the 5th Generation (5G) of wireless data communication, e.g. as specified by the Third Generation Partnership Project (3GPP), beamforming is expected to be widely applied for NR operation in mm-wave bands for both transmission and reception.

Beamforming is expected to be widely applied for NR operation in mm-wave bands for both transmission and reception. For UL transmission, a spatial relation needs to be established and understood by both the radio device (e.g., a UE) and a radio access node (e.g., a gNB) before transmission in the UL is conducted.

According to the spatial relation, the spatial filter to be used for the UL beam (i.e., the UL transmission using beamforming) may be based on a downlink (DL) transmission by virtue of channel reciprocity.

In existing procedure for beam failure detection (BFD), the UE is configured to monitor the DL reception by comparing the DL radio link quality for certain radio resources to a threshold. A beam failure instance (BFI) is triggered, if the measured radio link quality of all configured monitoring resources is below the threshold.

However, the DL radio quality as measured at the UE may not represent an interference at the gNB so that the UL beam may fail although the UE has not indicated a BFI. Furthermore, the spatial filter used by the UE for the UL transmission, i.e., the spatial direction of the UL beam, may be inaccurate at the time of the UL transmission, because the position or orientation of the UE has changed, or due to moving objects in the radio propagation path of the UL beam during the time elapsed, since the DL reception established the spatial filter.

UL beam transmission using an inaccurate spatial filter can causes substantial latency in the radio communication, because the beam failure recovery is delayed. Furthermore, it can cause interference to other radio device or radio access nodes in the radio access network. This holds particularly true as the radio frequency of the UL beam is increased in the future, e.g., for radio frequencies above 50 GHz.

SUMMARY

Accordingly, there is a need for a beam failure detection technique that improves beamforming accuracy in at least some situations. Alternatively or more specifically, there is a need for a beam failure detection technique at high radio frequencies. Alternatively or more specifically, there is a need for a beam failure detection technique that reduces latency and/or interference.

As to a first method aspect, a method of performing beam failure detection (BFD) of a radio beam between a radio device and a radio access node in a radio access network (RAN) is provided. The method is performed by the radio device. The method comprises or initiates a step of receiving a control message from the radio access network. The control message is indicative of a spatial relation between a first physical channel and a second physical channel. The method further comprises or initiates a step of monitoring a transmission or a transmission attempt to the radio access node on the second physical channel. The transmission or transmission attempt uses a filter in the spatial domain, which is used or configured for a transmission to the radio access node or a reception from the radio access node on the first physical channel according to the spatial relation. The method further comprises or initiates a step of performing the BFD based on a result of the monitoring.

The first method aspect may comprise, alternatively or in addition, any one of the features or steps disclosed in the embodiments described herein, preferably those referring to the first independent claim.

As to a second method aspect, a method of supporting beam failure detection (BFD) of a radio beam between a radio device and a radio access node in a radio access network (RAN) is provided. The method is performed by the radio access node. The method comprises or initiates a step of transmitting a control message to the radio device. The control message is indicative of a spatial relation between a first physical channel and a second physical channel. The method further comprises or initiates a step of monitoring a reception or a reception attempt from the radio device on the second physical channel. The reception or reception attempt uses a filter in the spatial domain, which is used or configured for a reception from the radio device or a transmission to the radio device on the first physical channel according to the spatial relation. The method further comprises or initiates a step of supporting the BFD based on a result of the monitoring.

The second method aspect may comprise, alternatively or in addition, any one of the features or steps disclosed in the embodiments described herein, preferably those referring to the second independent claim.

Alternatively or in addition, the second method aspect may further comprise any feature and any step disclosed in the context of the first method aspect, or a feature or step corresponding thereto, e.g., a receiver counterpart to a transmitter feature or step.

In any aspect, the method may be implemented as a method of triggering a beam failure by UL beam misalignment.

The control message may be transmitted by the radio access node or received by the radio device by means of a Transmission Configuration Indicator (TCI).

For uplink (UL) transmission, the spatial relation may be established and known by both a radio device (e.g., a UE)

and a radio access node (e.g. a gNB) before transmission in the UL is performed. The spatial relation is defined between first and second physical channels. The second physical channel may be an UL channel.

Herein, the expression channel may encompass a reference signal.

For example, the second physical channel is a physical uplink shared channel (PUSCH) or a physical uplink control channel (PUCCH) or a sounding reference signal (SRS). The first physical channel may be either a downlink (DL) reference signal (e.g., CSI-RS, SS/PBCH block) or another UL reference signal (e.g., SRS).

If the second physical channel (e.g., the UL channel or UL signal A) is spatially related to the first physical channel (e.g., the reference signal B) according to the spatial relation, it may imply that the UE or may configure the UE to beamform the second physical channel (e.g., A) in the same way as the UE received or transmitted the first physical channel (e.g., B). By establishing the spatial relation, the UE gets to know in which direction to beamform its transmission signal towards the targeted gNB. Alternatively or in addition, the gNB also understands how to configure its receive (RX) beam towards the UE.

The first method aspect may be performed at or by the radio device (for brevity and without limitation referred to as a UE). The radio access node may be a base station. The second method aspect may be performed at or by the radio access node (for brevity and without limitation referred to as a gNB).

In any aspect, the radio access node may form, or may be part of, the RAN, e.g., according to the Third Generation Partnership Project (3GPP) or according to the standard family IEEE 802.11 (Wi-Fi). The first and second method aspects may be performed by one or more embodiments of the radio device and radio access node, respectively, in the RAN.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with any of the base stations.

The radio access node may encompass any station that is configured to provide radio access to any of the radio devices. The base stations may also be referred to as transmission and reception point (TRP), radio access node or access point (AP). The base station or one of the radio devices functioning as a gateway (e.g., between the radio network and the RAN and/or the Internet) may provide a data link to a host computer providing the first and/or second data. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer and/or a Radio Resource Control (RRC) layer of a protocol stack for the radio communication.

For example, the MAC layer may be implemented according to or based on the 3GPP document TS 38.321 (e.g., for Release 17). Alternatively or in addition, the RRC layer may be implemented according to or based on the 3GPP document TS 38.331 (e.g., for Release 17). Alternatively or in addition, the PHY layer may be implemented according to or based on the 3GPP document TS 38.311 (e.g., for Release 17) and/or the 3GPP document TS 38.213 (e.g., for Release 17).

Alternatively or in addition, the technique may be implemented in the radio device and/or the radio access node as a Layer 2 module.

As to another aspect, a computer program product is provided. The computer program product comprises program code portions for performing any one of the steps of the first and/or second method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the first and/or second method aspect may be encoded in a Field-Programmable Gate Array (FPGA) and/or an Application-Specific Integrated Circuit (ASIC), or the functionality may be provided for download by means of a hardware description language.

As to a first device aspect, a device (e.g., a radio device) is provided. The device comprises memory operable to store instructions and processing circuitry operable to execute the instructions, such that the device (e.g., the radio device) is operable to perform the first method aspect.

As to a further first device aspect, a device (e.g., a radio device) is provided. The device is configured to perform the first method aspect.

As to a still further first device aspect, a user equipment (UE) is provided. The UE is configured to communicate with a base station (e.g., the radio access node). The UE comprises a radio interface and processing circuitry configured to execute the first method aspect.

As to a second device aspect, a device (e.g., a radio access node or network node) is provided. The device comprises memory operable to store instructions and processing circuitry operable to execute the instructions, such that the device (e.g., the radio access node or network node) is operable to perform the second method aspect.

As to a further second device aspect, a device (e.g., a radio access node or network node) is provided. The device is configured to perform the second method aspect.

As to a still further second device aspect, a base station (e.g., a radio access node or network node) is provided. The base station is configured to communicate with a UE (e.g., the radio device). The base station comprises a radio interface and processing circuitry configured to execute the second method aspect.

As to a still further aspect a communication system including a host computer is provided. The host computer comprises a processing circuitry configured to provide user data or receive user data, e.g., in the step of transmission of the UE and the step of reception of the base station. The host computer further comprises a communication interface configured to receive the user data through, or forward the user data to, a cellular network (e.g., the RAN and/or the base station) for transmission to a UE or when receiving from the UE. A processing circuitry of the cellular network is configured to execute any one of the steps of the second method aspect. The UE comprises a radio interface and processing circuitry, which is configured to execute any one of the steps of the first method aspect.

The communication system may further include the UE. Alternatively, or in addition, the cellular network may further include one or more base stations configured for radio communication with the UE and/or to provide a data link between the UE and the host computer using the first and/or second method aspects.

The processing circuitry of the host computer may be configured to execute a host application, thereby providing the first and/or second data and/or any host computer functionality described herein. Alternatively, or in addition, the processing circuitry of the UE may be configured to execute a client application associated with the host application.

Any one of the devices, the UE, the base station, the radio access node, the network node, the communication system or any node or station for embodying the technique may further include any feature disclosed in the context of the method aspects, and vice versa. Particularly, any one of the units and modules disclosed herein may be configured to perform or initiate one or more of the steps of the first or second method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including a Wireless Local Area Network (WLAN) implementation according to the standard family IEEE 802.11, 3GPP LTE (e.g., LTE-Advanced or a related radio access technique such as MulteFire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
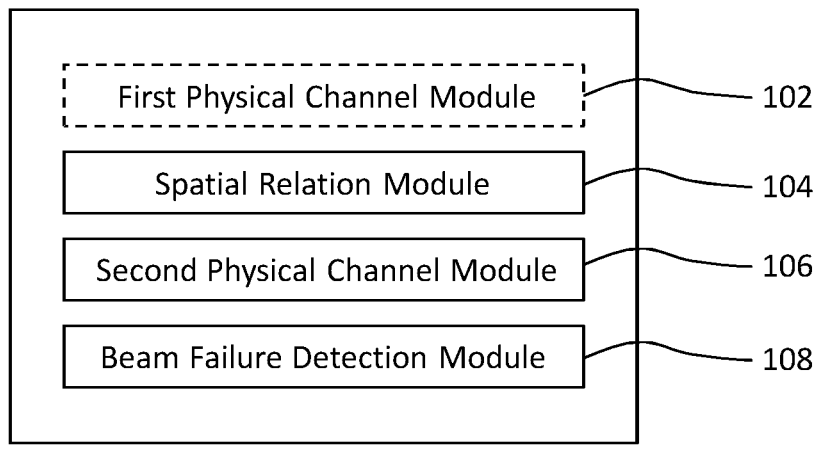
FIG. 1 shows a schematic block diagram of an embodiment of a device for performing beam failure detection of a radio beam between a radio device and a radio access node in a radio access network.

FIG. 1 schematically illustrates a block diagram of an embodiment of a device for performing beam failure detection (BFD) of a radio beam between a radio device and a radio access node in a radio access network (RAN). The device is generically referred to by reference sign 100.

The device 100 comprises a spatial relation module 104 that receives a control message from the radio access network. The control message comprises or is indicative of a spatial relation between a first physical channel and a second physical channel. The device 100 further comprises a second physical channel module 106 that monitors a transmission or a transmission attempt to the radio access node on the second physical channel. The transmission or transmission attempt uses a filter in the spatial domain (also: spatial filter or briefly: filter). The filter is used (or usable or configured) for a transmission to the radio access node or a reception from the radio access node on the first physical channel according to the spatial relation. The device 100 further comprises a BFD module 108 that performs the BFD based on a result of the monitoring.

Optionally, the device 100 comprises a first physical channel module 102 that transmits to the radio access node or receiving from the radio access node on the first physical channel using the filter in the spatial domain.

Any of the modules of the device 100 may be implemented by units configured to provide the corresponding functionality.

The device 100 may also be referred to as, or may be embodied by, the radio device (or user equipment or briefly UE). The radio device 100 and the radio access node may be in direct radio communication, e.g., through the first and second physical channels. The radio access node may be embodied by the device 200.

Figure 2:
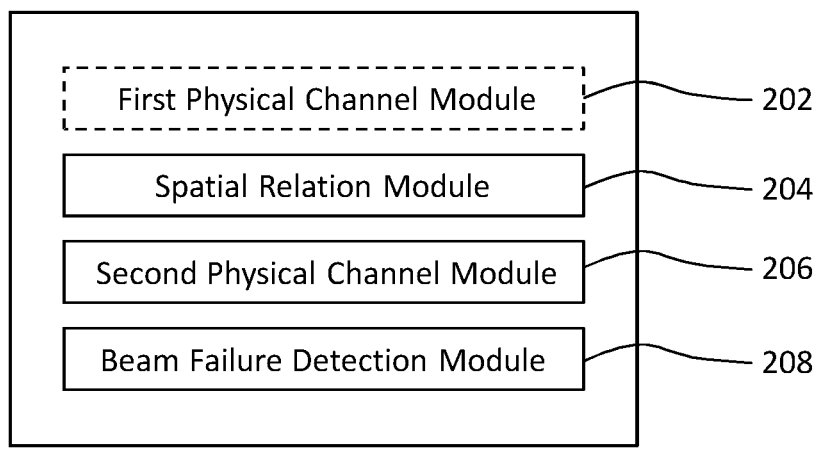
FIG. 2 shows a schematic block diagram of an embodiment of a device for supporting beam failure detection of a radio beam between a radio device and a radio access node in a radio access network.

FIG. 2 schematically illustrates a block diagram of an embodiment of a device for supporting beam failure detection (BFD) of a radio beam between a radio device and a radio access node in a radio access network (RAN). The device is generically referred to by reference sign 200.

The device 200 comprises a spatial relation module 204 that transmits a control message to the radio device. The control message comprises or is indicative of a spatial relation between a first physical channel and a second physical channel. The device 200 further comprises a second physical channel module 206 that monitors a reception or a reception attempt from the radio device on the second physical channel. The reception or reception attempt uses a filter in the spatial domain (also: spatial filter or briefly: filter). The filter is used (or usable or configured) for a reception from the radio device or a transmission to the radio device on the first physical channel according to the spatial relation. The device 200 further comprises a BFD module 208 that supports the BFD based on a result of the monitoring.

Optionally, the device 200 comprises a first physical channel module 202 that receives the reception from the radio device and/or transmits the transmission to the radio device on the first physical channel using the filter in the spatial domain.

Any of the modules of the device 200 may be implemented by units configured to provide the corresponding functionality.

The device 200 may also be referred to as, or may be embodied by, the radio access node (or base station). The radio device and the access node 200 may be in direct radio communication, e.g., at least for through the first and second physical channels. The radio device may be embodied by the device 100.

Figure 3:
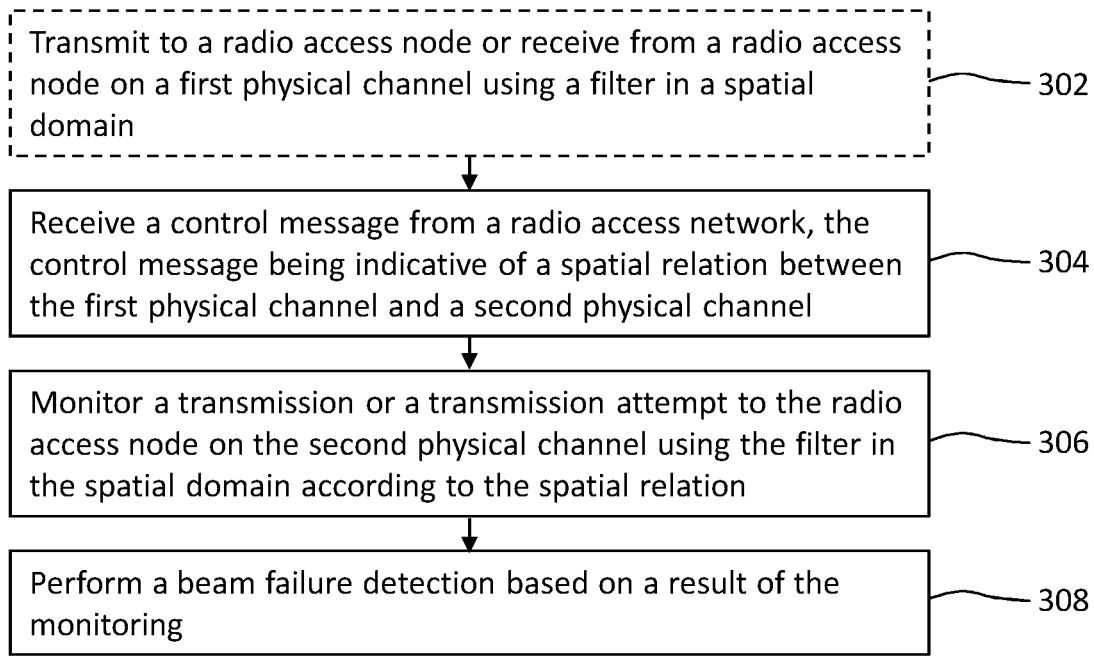
FIG. 3 shows a flowchart for a method of performing beam failure detection of a radio beam between a radio device and a radio access node in a radio access network, which method may be implementable by the device of FIG. 1.

FIG. 3 shows an example flowchart for a method 300 of performing beam failure detection (BFD) of a radio beam between a radio device and a radio access node in a radio access network (RAN). The method 300 may be performed by the radio device.

In a step 304, a control message is received from the radio access network (e.g., from the radio access node). The control message comprises or is indicative of a spatial relation between a first physical channel and a second physical channel. In a step 306, a transmission or a transmission attempt to the radio access node on the second physical channel is monitored. The transmission or transmission attempt uses a filter in the spatial domain. The filter is used (or usable or configured) for a transmission to the radio access node or a reception from the radio access node on the first physical channel according to the spatial relation. In a step 308, the BFD is performed based on a result of the monitoring.

Optionally, in a step 302, the transmission to the radio access node and/or the reception from the radio access node on the first physical channel is performed using the filter in the spatial domain.

The method 300 may be performed by the device 100. For example, the modules 102, 104, 106 and 108 may perform the steps 302, 304, 306 and 308, respectively.

Figure 4:
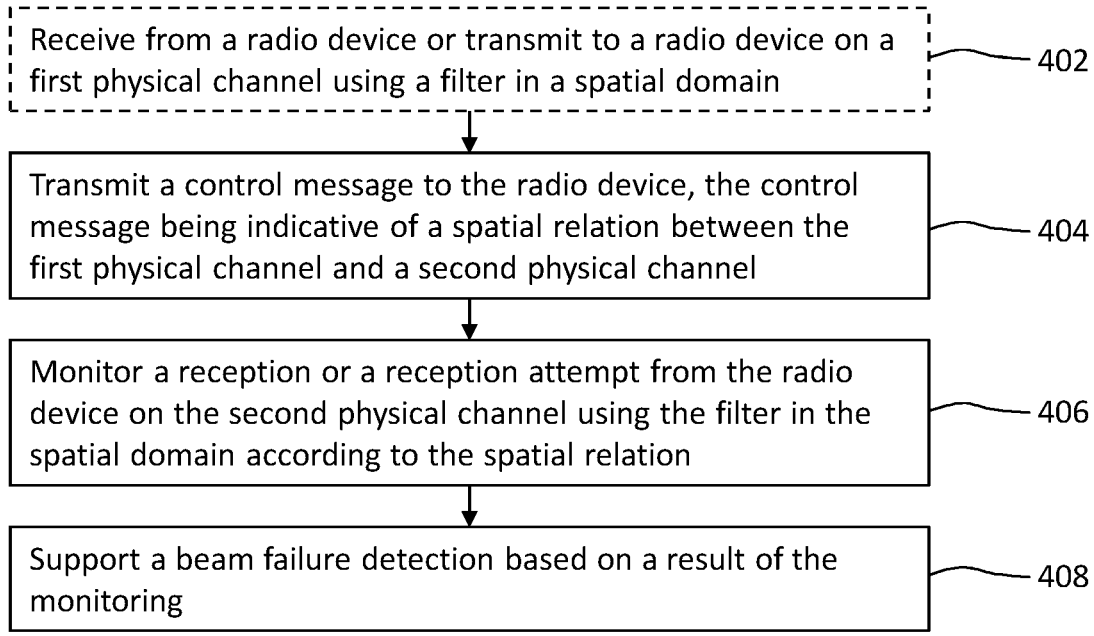
FIG. 4 shows a flowchart for a method of supporting beam failure detection of a radio beam between a radio device and a radio access node in a radio access network, which method may be implementable by the device of FIG. 2.

FIG. 4 shows an example flowchart for a method 400 of supporting beam failure detection (BFD) of a radio beam between a radio device and a radio access node in a radio access network (RAN). The method 400 may be performed by the radio access node.

In a step 404, a control message is transmitted to the radio device (e.g., from the radio access node). The control message comprises or is indicative of a spatial relation between a first physical channel and a second physical channel. In a step 406, a reception or a reception attempt from the radio device on the second physical channel is monitored. The reception or reception attempt uses a filter in the spatial domain. The filter is used (or usable or configured) for a reception from the radio device or a transmission to the radio device on the first physical channel according to the spatial relation. In a step 408, the BFD is supported based on a result of the monitoring.

Optionally, in a step 402, the method 400 comprises the reception from the radio device and/or the transmission to the radio device on the first physical channel, which is performed using the filter in the spatial domain.

The method 400 may be performed by the device 200. For example, the modules 202, 204, 206 and 208 may perform the steps 402, 404, 406 and 408, respectively.

Embodiments of the technique can take the result of monitoring the transmission or transmission attempt on the second physical channel into account when determining a failure of the radio beam according to the BFD. For example, results of monitoring both the first physical channel and the second physical channel may be combined when determining a failure of the radio beam according to the BFD.

The second physical channel may be an uplink (UL) channel. The transmission or transmission attempt on the second physical channel may be an UL transmission or an UL transmission attempt. Alternatively or in addition, the step of monitoring the transmission or the transmission attempt may comprise performing the transmission (e.g., the UL transmission) or the transmission attempt on the second physical channel.

Performing the BFD may comprise triggering a beam failure if the monitoring is indicative of a failure of the transmission on the second physical channel that is spatially related to the first physical channel.

The control message may be received from the radio access node in a radio access network.

Herein, any one of the first and second "physical channels" may be implemented by one or more physical signals, e.g., one or more reference signals or synchronization signals. The first physical channel may be an uplink channel or uplink reference signal (e.g., PUCCH, PUCCH or SRS) or a downlink channel or downlink reference signal (e.g., CSI-RS or SS/PBCH block) or another uplink reference signal (e.g., SRS).

The transmission or the reception on the first physical channel may comprise transmitting or receiving at least one physical signal, e.g., at least one reference signal or at least one synchronization signal. Alternatively or in addition, the transmission or the reception on the first physical channel may comprise transmitting or receiving data (e.g., user data or control data).

The transmission or the transmission attempt on the second physical channel may comprise transmitting or attempting to transmit at least one physical signal, e.g., at least one reference signal. Alternatively or in addition, the transmission or the transmission attempt on the second physical channel may comprise transmitting or attempting to transmit data (e.g., user data or control data).

Performing the BFD may also be referred to as detecting or determining a failure of the radio beam or as detecting or determining a beam failure.

The step of performing the BFD may comprise triggering a beam failure (BF) of the radio beam based on a result of the monitoring.

The filter in the spatial domain may also be referred to as spatial domain filter or spatial filter or beamforming filter.

The transmitting or receiving on the first physical channel using the spatial filter may also be referred to as transmitting or receiving the radio beam. If the first physical channel is an UL or DL channel and/or if the first physical channel comprises UL or DL physical signals and/or if the radio device transmits to the radio access node or receives from the radio access node on the first physical channel, the first channel may also be referred to as a (e.g., first) UL or DL beam, respectively.

The transmitting or attempting to transmit on the second physical channel using the spatial filter may also be referred to as transmitting or attempting to transmit the radio beam. If the second physical channel is an UL channel and/or if the first physical channel comprises UL physical signals and/or if the radio device transmits to the radio access node to the radio access node on the first physical channel, the first channel may also be referred to as a (e.g., first) UL or DL beam, respectively.

A failure of the transmission or transmission attempt may also be referred to as a beam failure instance (BFI) or beam failure event.

Preferably responsive to the result of the monitoring 306 comprising or being indicative of a failure of the transmission or the transmission attempt, performing 308 the BFD may be indicative of a beam failure (BF) event, preferably from a physical layer to a medium access control layer in a protocol stack of the radio device 100. Alternatively or in addition, preferably responsive to the result of the monitoring 306 comprising or being indicative of a failure of the transmission or the transmission attempt, performing 308 the BFD may trigger a beam failure recovery (BFR), preferably from a physical layer to a medium access control layer in a protocol stack of the radio device 100. Alternatively or in addition, preferably responsive to the result of the monitoring 306 comprising or being indicative of a failure of the transmission or the transmission attempt, performing 308 the BFD may comprise performing a BFR.

Indicating the BF may also be referred to as the beam failure being detected. After detecting the BF, the radio device may perform the BFR.

The BFR may comprise at least one of performing or initiating a Random Access (RA) procedure on a PCell, e.g., the radio access node and selecting another spatial filter or changing the spatial filter (which may also be referred to as selecting another radio beam other than the radio channel) to perform beam failure recovery. If the radio access node has provided dedicated RA resources for certain beams, the radio device may prioritize those resources. Upon completion of the RA procedure, BFR may be considered complete.

The second physical channel may be in unlicensed spectrum.

The transmission or transmission attempt on the second physical channel (e.g., 608 in any one of FIGS. 6A to 6C) may comprises a contention-based protocol or listen-before talk protocol. The result of the monitoring 306 may comprise, or may be indicative of, a failure of the transmission or transmission attempt, if the contention-based protocol or the listen-before talk protocol fails or indicates that the second physical channel is occupied. Alternatively or in addition, the result of the monitoring 306 may comprise, or may be indicative of, a failure of the transmission or transmission attempt, if a number of failures of the contention-based protocol or of the listen-before talk protocol and/or a ratio of failures and successes of contention-based protocol or the listen-before talk protocol is greater than a predefined or configured threshold.

A feedback may be received or expected to be received from the radio access node 200 in response to the transmission or transmission attempt. The result of the monitoring 306 may comprise or may be indicative of a failure of the transmission or transmission attempt, if the feedback is absent. Alternatively or in addition, the result of the monitoring 306 may comprise or may be indicative of a failure of the transmission or transmission attempt, if the feedback is indicative of a negative acknowledgment. Alternatively or in addition, the result of the monitoring 306 may comprise or may be indicative of a failure of the transmission or transmission attempt, if the feedback is indicative of a signal to noise ratio (SNR) or a signal to interference ratio (SIR) or a signal to interference and noise ratio (SINR), at least one or each of which is less than a configured or predefined threshold. Alternatively or in addition, the result of the monitoring 306 may comprise or may be indicative of a failure of the transmission or transmission attempt, if the feedback is indicative of a reference signal received power (RSRP) or a reference signal received quality (RSRQ) or a received signal strength indication (RSSI), at least one or each of which is less than a configured or predefined threshold.

Providing the feedback or the absence of the feedback (e.g. in the step 408) may be an example of supporting the BFD.

The result of the monitoring 306 may comprises or may be indicative of a failure of the transmission or transmission attempt, if interference and/or congestion is detected on the second physical channel 608, optionally when applying the filter.

The result of the monitoring 306 may comprises or may be indicative of a failure of the transmission or transmission attempt, if retransmissions of the transmission or transmission attempt on the second physical channel 608 reach or exceed a predefined or configured maximum number, optionally in the absence of positive acknowledgement or any response received from the radio access node 200.

The result of the monitoring 306 may comprise or may be indicative of a failure of the transmission or transmission attempt, if retransmissions of the transmission or transmission attempt on the second physical channel 608 reach or exceed a predefined or configured maximum time period, optionally in the absence of a positive acknowledgement or any response received from the radio access node 200.

The control message 700 may comprise a Radio Resource Control (RRC) signaling from the radio access node 200. Alternatively or in addition, the control message 700 may comprise a Control Element of Medium Access Control (MAC CE) from the radio access node 200. Alternatively or in addition, the control message 700 may comprise Downlink Control Information (DCI) from the radio access node 200, optionally wherein a DCI format is implicitly indicative of the spatial relation. Alternatively or in addition, the control message 700 may comprise a command for switching a Transmission Configuration Indication (TCI) state and/or an indicator of an active TCI state, optionally wherein the active TCI state is implicitly indicative of the spatial relation.

The control message 700 may comprise at least one of a channel resource identifier 702 that is indicative of the second physical channel 608 and a Spatial Relation Information (SRI) field 704 that is indicative of the first physical channel (e.g., 602 in any one of FIGS. 6A to 6C) being spatially related to the second physical channel 602.

The first physical channel 602 may be a downlink (DL) channel from the radio access node 200 to the radio device 100. Alternatively or in addition, the first physical channel 602 may comprise a Channel State Information Reference Signal (CSI-RS). Alternatively or in addition, the first physical channel 602 may comprise a Synchronization Signal (SS) or a Synchronization Signal Block (SSB). Alternatively or in addition, the first physical channel 602 may comprise a Physical Broadcast Channel (PBCH). Alternatively or in addition, the first physical channel 602 may comprise a Sounding Reference Signal (SRS).

The second physical channel may be an uplink (UL) channel from the radio device 100 to the radio access node 200. Alternatively or in addition, the second physical channel may comprise a Physical Uplink Shared Channel (PUSCH). Alternatively or in addition, the second physical channel may comprise a Physical Uplink Control Channel (PUCCH). Alternatively or in addition, the second physical channel may comprise. Alternatively or in addition, the second physical channel may comprise a Sounding Reference Signal (SRS). Alternatively or in addition, the second physical channel may comprise. Alternatively or in addition, the second physical channel may comprise a Random Access Preamble (RAP) or a Random Access Channel (RACH).

Using the filter (e.g., 604 in any one of FIGS. 6A to 6C) in the spatial domain 506 according to the spatial relation may comprise using the same precoder and/or the same beamforming weights for the transmission or reception on the first physical channel 602 and for the transmission or transmission attempt on the second physical channel 608.

The first physical channel and the second physical channel may be in spatial relation (i.e., spatially related) if the radio device transmits or receives on the first physical channel using the same precoder or the same beamforming weights as the one or ones used for the transmission or transmission attempt on the second physical channel. Alternatively or in addition, transmitting or receiving on the first physical channel and transmitting or attempting to transmit on the second physical channel may be in spatial relation (i.e., spatially related) if the radio device transmits or receives on the first physical channel using the same precoder or the same beamforming weights as the one or ones used for the transmission or transmission attempt on the second physical channel.

The method 300 may be performed by the radio device 100. The method 300 may further comprise or initiate the step 302 of transmitting to the radio access node 200 or the step 302 of receiving from the radio access node 200 on the first physical channel 602 using the filter 604 in the spatial domain 506.

The step 302 of transmitting or receiving on the first physical channel 602 may comprise incrementing a beam failure instance counter responsive to a failure of the transmission 302 and/or reception 302 on the first physical channel 602. Alternatively or in addition, the step 306 of monitoring the transmission or transmission attempt on the second physical channel 608 may comprise incrementing a beam failure instance counter responsive to a failure of the transmission or the transmission attempt on the second physical channel 608.

The same beam failure instance counter may be incremented responsive to the failure of the transmission 302 and/or reception 302 on the first physical channel 602 and responsive to the failure of the transmission or the transmission attempt on the second physical channel 608. Optionally, a BFR may be triggered if the same beam failure instance counter reaches or exceeds a configured or predefined threshold.

A DL beam failure instance counter may be incremented responsive to the failure of the reception 302 on the first physical channel 602. Alternatively or in addition, an UL beam failure instance counter may be incremented responsive to the failure of the transmission or the transmission attempt on the second physical channel 608. Optionally, a BFR may be triggered if the UL beam failure instance counter reaches or exceeds a configured or predefined threshold.

In one example, a BF event may be declared and/or a BFR may be triggered (e.g., for the corresponding serving cell) if a separate counter for UL BF instances has reached a configured or predefined threshold, preferably regardless if a counter of DL BF instances has reached another configured or predefined threshold.

The step 308 of performing the BFD may comprise, responsive to detecting a beam failure (BF), performing or triggering a beam failure recovery (BFR). Alternatively or in addition, the step 308 of performing the BFD may comprise, responsive to detecting a BF, transmitting a report indicative of the BF to the radio access node 200. Alternatively or in addition, the step 308 of performing the BFD may comprise, responsive to detecting a BF, storing a report indicative of the BF, optionally and transmitting the stored report after the BFR to the RAN (e.g., 600 in any one of FIGS. 6A to 6C) or the radio access node 200.

A may be detected by the BFD. Detecting the BF may also be referred to as a BF event. The BF event may be a BF instance as a result of the monitoring. One or multiple BF instances may lead to a BF event, e.g., by means of any one of the counters disclosed herein.

BF instances may comprise beam misalignment instances.

The report may be indicative of a failure event, optionally a BF event, caused by consecutive BF instances or beam misalignment instances in DL receptions, optionally on the first physical channel 602. Alternatively or in addition, the report may be indicative of a failure event, optionally a BF event, caused by consecutive BF instances or beam misalignment instances in UL transmissions based on the result of the monitoring 306. Alternatively or in addition, the report may be indicative of a failure event, optionally a BF event, caused by consecutive BF instances or beam misalignment instances in DL receptions, optionally on the first physical channel 602, and in UL transmissions based on the result of the monitoring 306.

The report may be indicative of a ratio of BF instances or beam misalignment instances in DL receptions and in UL transmissions. Alternatively or in addition, report may be indicative of a number of BF instances or beam misalignment instances.

A report, optionally the afore-mentioned report, may be indicative of one or more candidate beams preferred by the radio device 100. Optionally, the report may be indicative of indices of SSBs or SSB groups. Alternatively or in addition, the report may be indicative of indices of CSI-RS resources associated with the one or more candidate beams. Alternatively or in addition, the report may be indicative of indices of SRS resources associated with the one or more candidate beams. Alternatively or in addition, the report may be indicative of indices of TCI states associated with the one or more candidate beams.

A report, optionally the afore-mentioned report, may be indicative of the radio beam for which the BF has been detected. Alternatively or in addition, the report may be indicative of the second physical channel 608 for which the BF has been detected. Alternatively or in addition, the report may be indicative of the combination of the filter 604 in the spatial domain 506 and the second physical channel 608, for which the BF has been detected.

A report, optionally the afore-mentioned report, may be indicative of one or more radio quality measurement results of one or more radio beams for which no BF has been detected. Alternatively or in addition, the report may be indicative of one or more radio physical channels for which no BF has been detected. Alternatively or in addition, the report may be indicative of one or more combinations of a filter in the spatial domain 506 and a physical channel, for which no BF has been detected.

The report may be configured to trigger the radio access node to select a candidate beam (e.g. an SSB) for the radio device based on the reported measurement results.

Herein, the beams and/or the physical channels may encompass an SSB.

Responsive to detecting the beam failure, the radio device may perform a procedure for beam failure recovery (a beam failure recovery procedure).

For BFD, the radio access node (e.g., a gNB) may configure the radio device (e.g., a UE) with one or more first physical channels (which may also be referred to as beam failure detection channels or beam failure detection reference signals, e.g. SSB or CSI-RS). In other words, the radio device is configured to monitor a transmission and/or a reception on the one or more first physical channels. For example, the radio device declares beam failure (i.e., the BFD is indicative of a beam failure) when the beam failure instance counter (e.g., a number of beam failure instance indications from a physical layer, PHY) of the radio device reaches a (e.g., predefined or configured) threshold before a (e.g., predefined or configured) timer expires. Embodiments may expand the physical channels based on which the BFD is performed by further monitoring at least one or each of the second physical channels (e.g., further reference signals), which are in spatial relation to the one or more first physical channels. Particularly, the BFD may be performed based on the result of monitoring UL transmissions using the filter in the spatial domain.

The first physical channel may comprise SSB. The BFD may be based on the SSB associated to an initial DL Bandwidth Part (BWP) and can only be configured for the initial DL BWPs and for DL BWPs containing the SSB associated to the initial DL BWP. For BFD based on other DL BWPs, the second physical channel may comprise CSI-RS.

The radio device 100 may be a user equipment (UE). Preferably, the UE may be configured to radio access the radio access node 200 in at least one cell of the RAN (e.g., 600 in any one of FIGS. 6A to 6C).

The radio access node 200 may be a radio base station. Preferably, the radio base station may be configured to provide radio access to the radio device 100 in at least one cell of the RAN (e.g., 600 in any one of FIGS. 6A to 6C).

Using the filter may comprise applying beamforming weights to antenna elements (e.g., 101 in any one of FIGS. 6A to 6C) of an antenna array comprising a plurality of the antenna elements.

At least one of or both the first physical channel 602 and the second physical channel may be in a frequency range above 50 GHz and/or in mm-wave bands, preferably in a frequency range from 52.6 GHz to 71 GHz.

The monitored transmission or transmission attempt may be based on a periodic or semi-persistent configuration received from the radio access node, and wherein the result of the monitoring 306 is indicative of a failure of the transmission or the transmission attempt if a negative acknowledgment is received from the radio access node 200.

In any aspect, the transmission and/or reception in the step 302 or 402 may define the spatial filter 604 at the radio device 100 or the spatial filter (e.g., 606 in any one of FIGS. 6A to 6C) at the radio access node 200.

In any aspect, a combination of a physical channel (e.g., the first or second physical channel) and the spatial filter may be referred to as a radio beam (or briefly: beam). In the case of an uplink channel, the combination may be referred to as an uplink beam. In the case of a downlink channel, the combination may be referred to as a downlink beam. Transmitting on the respective physical channel using the spatial filter may be referred to as transmission (TX) beam. Receiving on the respective physical channel using the spatial filter may be referred to as reception (RX) beam.

The technique may be applied to uplink (UL), downlink (DL) or direct communications between radio devices, e.g., device-to-device (D2D) communications or sidelink (SL) communications.

Any radio device 100 may be a user equipment (UE). Any radio access node 200 may be a radio base station (or briefly: base station).

Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP SL connection. Furthermore, any base station may be a station providing radio access, may be part of a radio access network (RAN) and/or may be a node connected to the RAN for controlling the radio access. For example, the base station may be an access point, for example a Wi-Fi access point.

Herein, whenever referring to noise or a signal-to-noise ratio (SNR), or to interference or a signal-to-interference ratio (SIR), a corresponding step, feature or effect is also disclosed for noise and/or interference or a signal-to-interference-and-noise ratio (SINR).

Figure 5:
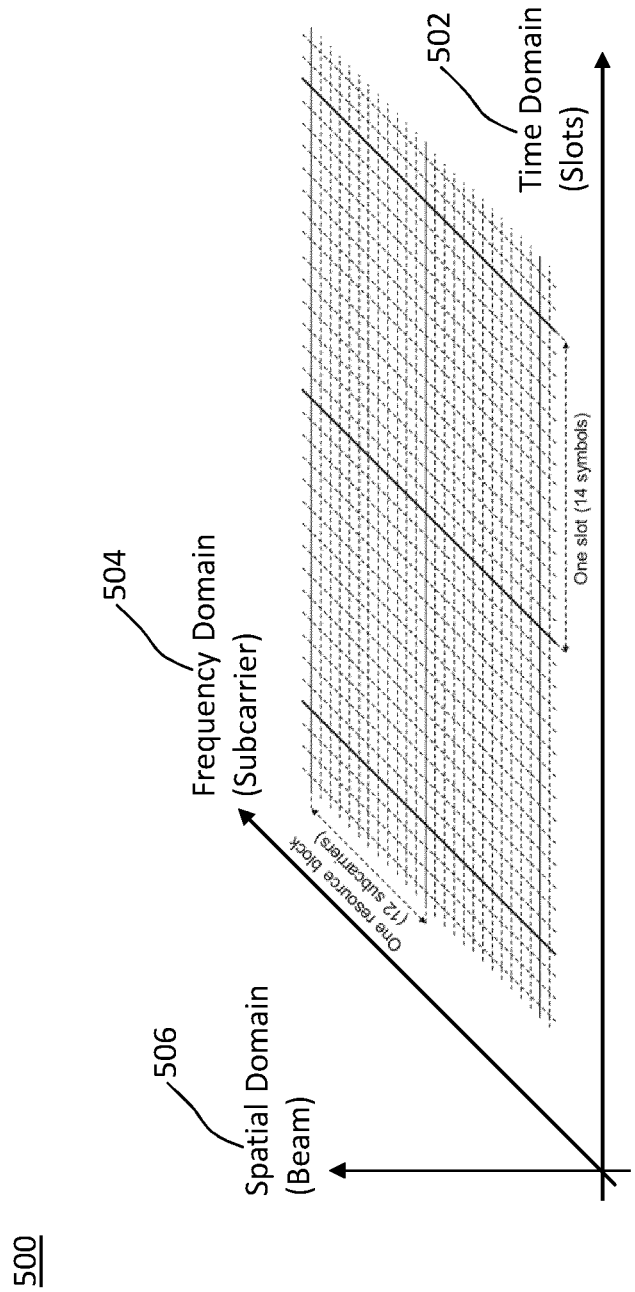
FIG. 5 schematically illustrates radio resources in a time domain, a frequency domain and a spatial domain.

FIG. 5 schematically illustrates radio resources in a time domain 502, a frequency domain 504 and a spatial domain 506. The first and second physical channels may be distinguished or defined in terms of the frequency domain 504 and/or the time domain 502.

The time domain 502 may be defined or structured in terms of radio frames, slots, transmission time intervals and/or symbols.

The frequency domain 504 may be defined or structured in terms of physical resource blocks and/or subcarriers.

The spatial domain 506 may be defined or structured in in terms of beams or spatial filters.

Herein, any given spatial filter may be used (i.e., applied to) or usable (i.e., applicable to) or configured for both a transmission and a reception, e.g., by virtue of channel reciprocity. For example, a direction of reception in a reception using the filter may define the direction of transmission in a transmission using the same filter.

Any embodiment may use a NR frame structure. Similar to LTE, NR uses Orthogonal Frequency Division Multiplexing (OFDM) in the downlink (i.e., from the radio access node, e.g., a network node, gNB, eNB, or base station, to the radio device, e.g., a user equipment or UE). The basic NR physical resource over an antenna port can thus be seen as a time-frequency grid as illustrated by the horizontal plane in FIG. 5, wherein a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times2^\mu)$ kHz where $\mu \in (0,1,2,3,4)$. $\Delta f=15$ kHz is the basic (or reference) subcarrier spacing that is also used in LTE.

FIG. 5 schematically illustrates a grid of physical radio resources, e.g., for a NR system.

In the time domain, downlink and uplink transmissions in NR will be organized into equally-sized subframes of 1 ms each similar to LTE. A subframe is further divided into multiple slots of equal duration. The slot length for subcarrier spacing $\Delta f=(15\times2^\mu)$ kHz is $1/(2^\mu)$ ms. There is only one slot per subframe for $\Delta f=15$ kHz and a slot consists of 14 OFDM symbols.

Downlink transmissions are dynamically scheduled, i.e., in each slot the gNB transmits downlink control information (DCI) about which UE data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A UE first detects and decodes PDCCH and if a PDCCH is decoded successfully, it then decodes the corresponding PDSCH based on the downlink assignment provided by decoded control information in the PDCCH. In addition to PDCCH and PDSCH, there are also other channels and reference signals transmitted in the downlink, including a Synchronization Signal Block (SSB), a reference signal (RS) for Channel State Information (CSI), i.e. CSI-RS, etc.

Uplink data transmissions, carried on Physical Uplink Shared Channel (PUSCH), can also be dynamically scheduled by the gNB by transmitting a DCI. The DCI (which is transmitted in the DL region) always indicates a scheduling time offset so that the PUSCH is transmitted in a slot in the UL region.

Figure 6A:
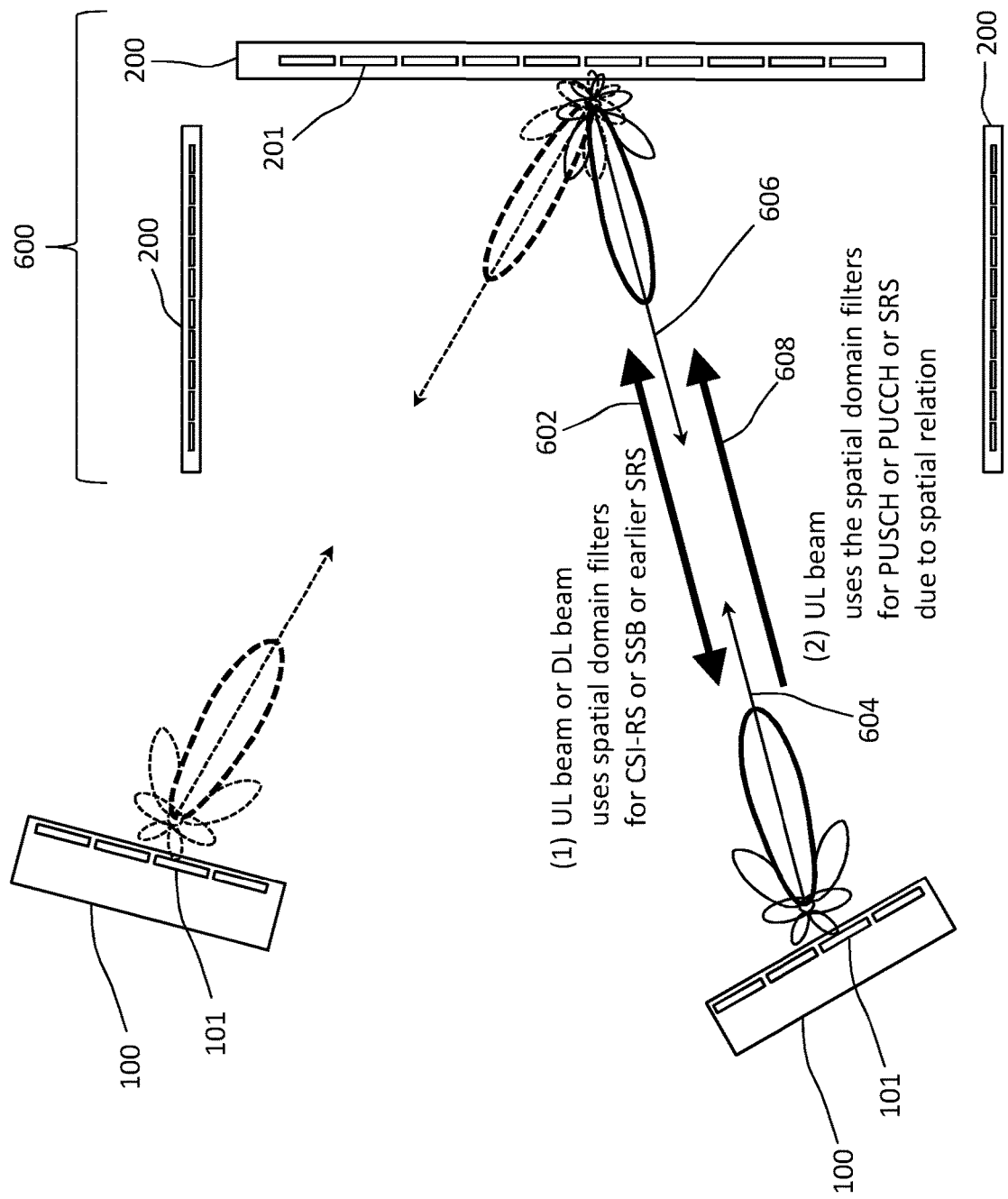
FIG. 6A schematically illustrates an exemplary network environment for implementing the devices of FIGS. 1 and 2.

FIG. 6A schematically illustrates an exemplary network environment for implementing at least one embodiment of the radio device 100 and at least one embodiment of the radio access node 200 in the RAN 600.

For transmitting or receiving using the filter 604, the radio device 100 comprises an array of antenna elements 101. For transmitting or receiving using the filter 606, the access node 200 comprises an array of antenna elements 201.

The reception 302 or transmission 402 on the first physical channel 602 may comprise a channel state information reference signal (CSI-RS) and/or a synchronization signal block (SSB). Alternatively or in addition, the transmission 302 or reception 402 on the first physical channel 602 may comprise a sounding reference signal (SRS).

The transmission 306 or reception 406 on the second physical channel 608 may comprise a physical uplink shared channel (PUSCH) and/or a physical uplink control channel (PUCCH) and/or a sounding reference signal (SRS, optionally other than the SRS in the steps 302 and 402).

Figure 6B:
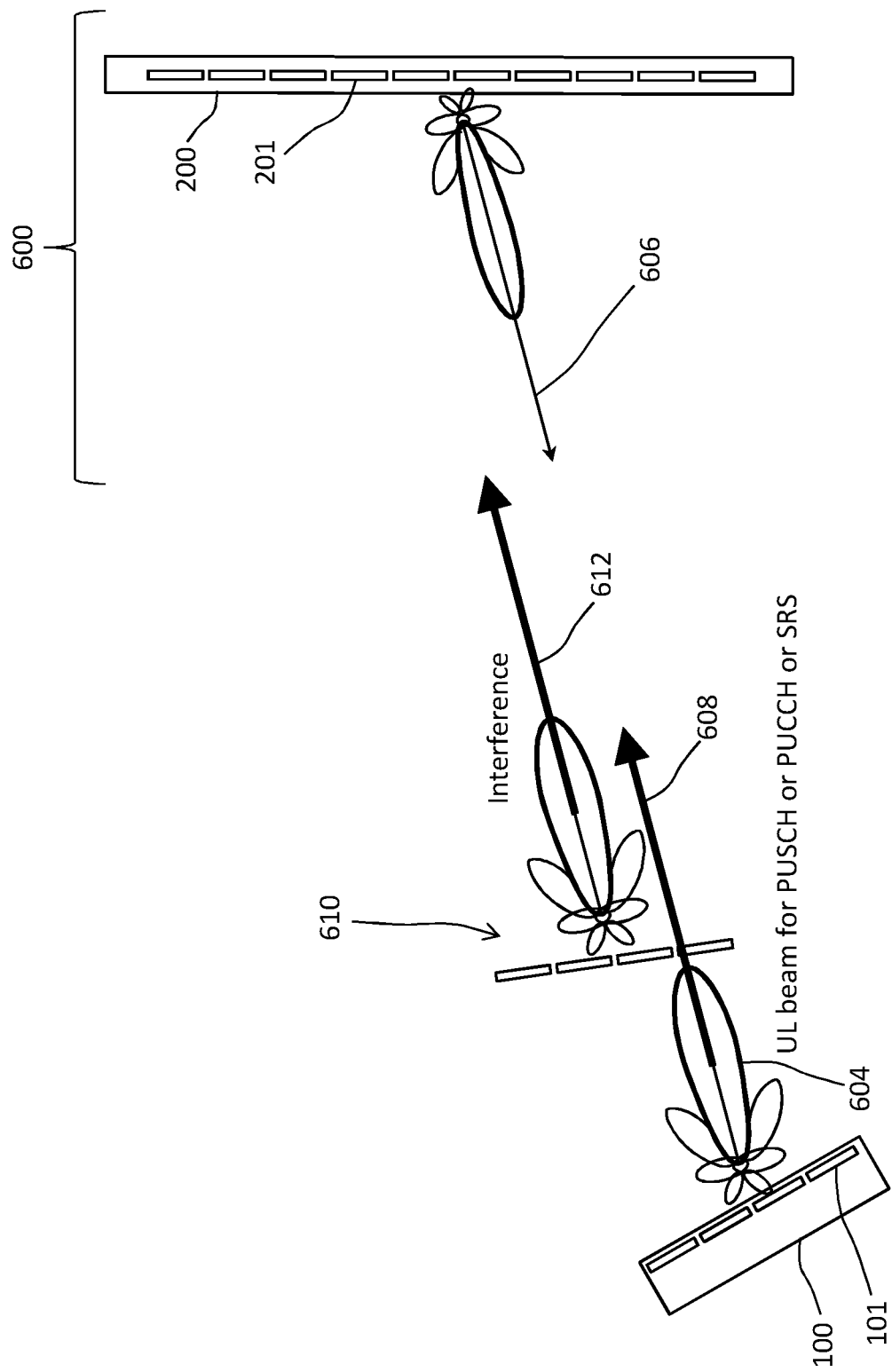
FIG. 6B schematically illustrates an exemplary network environment for implementing the devices of FIGS. 1 and 2.

FIG. 6B schematically illustrates an exemplary network environment for implementing at least one embodiment of the radio device 100 and at least one embodiment of the radio access node 200 in the RAN 600. Features described in the context of the FIG. 6A may persist for any of the embodiments described in the context of FIG. 6B.

An interferer 610 may be present, e.g., along a radio propagation of the UL beam 608 (i.e. the second physical channel using the filter 604 and 606, respectively, in the steps 306 and 406, respectively) causing interference 612 in the direction of the radio access node 200. Hence, when attempting to receive in the step 402 the transmission attempted performed by the radio device 100 in the step 302 on the second physical channel 608, the radio access node 200 may be unable to decode the reception and support the BFD by transmitting a negative acknowledgment (NACK) to the radio device 100.

The UL transmission 306 on the second channel 608 may fail, e.g. even though the previous transmission 302 or reception 302 on the first channel was successful using the same filter 604. For example, an interferer may transmit at the time of the transmission 306 on the second channel or on the frequency of the second channel. Alternatively or in addition, an interferer may transmit in the direction of the radio access node 200 causing interference 612 that is hidden to the radio device 100.

Figure 6C:
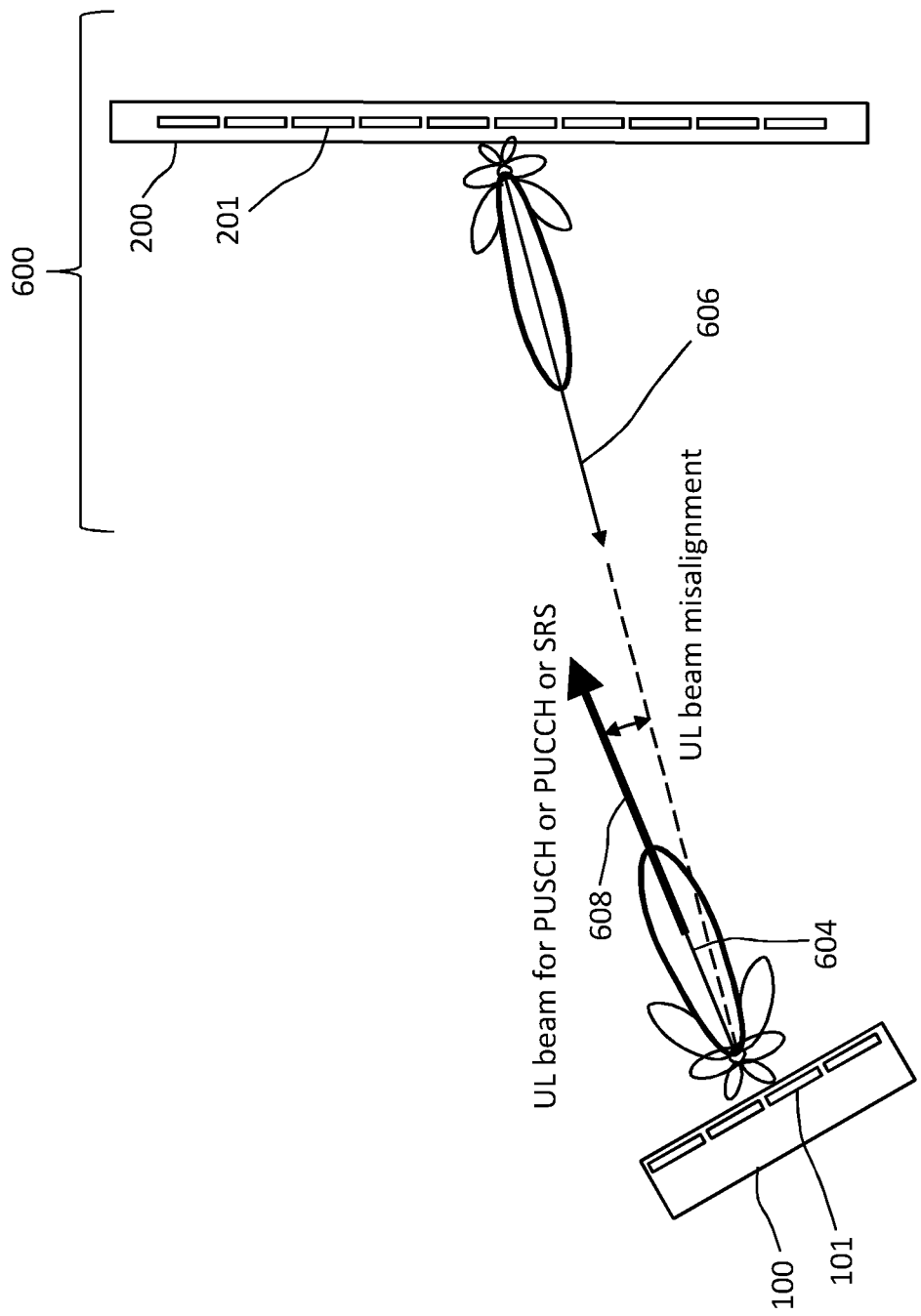
FIG. 6C schematically illustrates an exemplary network environment for implementing the devices of FIGS. 1 and 2.

FIG. 6C schematically illustrates an exemplary network environment for implementing at least one embodiment of the radio device 100 and at least one embodiment of the radio access node 200 in the RAN 600. Features described in the context of the FIG. 6A and/or FIG. 6B may persist for any of the embodiments described in the context of FIG. 6C.

At the time of transmitting 306 on the second channel 608 using the filter 604 (i.e., the UL beam 608), the spatial filter 604 may be outdated, e.g., due to movement (e.g., a rotation) of the radio device 100. In other words, the UL beam 608 may be misaligned.

Figure 7:
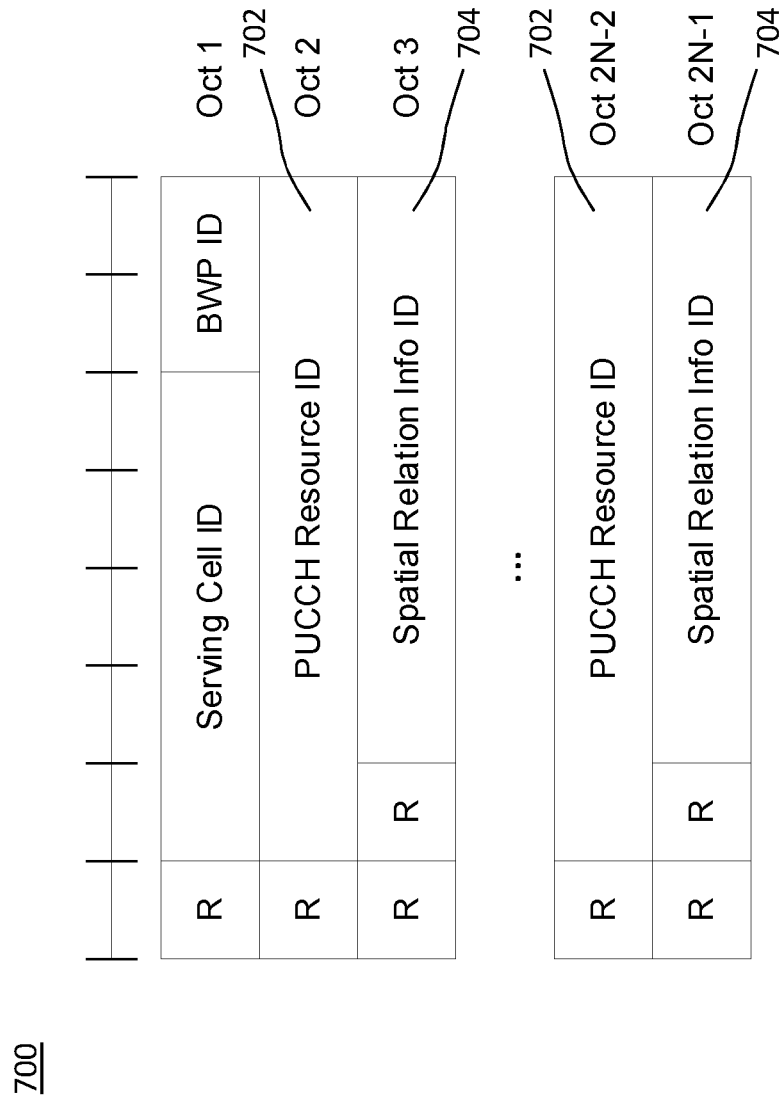
FIG. 7 schematically illustrates an exemplary control message indicating a spatial relation between the first physical channel and the second physical channel.

FIG. 7 schematically illustrates an exemplary control message 700 indicating a spatial relation between the first physical channel and the second physical channel. The control message may be a Medium Access Control (MAC) Control Element (CE).

The control message 700 may be indicative of the second physical channel 608 by means of an identifier (ID) 702. The control message 700 may be indicative of the spatial relation by means of a Spatial Relation Information (SRI) field 704 that is indicative of the first physical channel 602 being spatially related to the second physical channel 608. The SRI field 704 may comprise an identifier (ID) of the first physical channel 602 (e.g., for determining a reference signal).

Any of the embodiments may be implemented for NR operation in mm-wavebands.

NR supports a diverse set of use cases and a diverse set of deployment scenarios. The later includes deployment at both low frequencies (100s of MHz), and very high frequencies (mm waves in the tens of GHz). Two operation frequency ranges are defined in NR Release 15: FR1 from 410 MHz to 7125 MHz and FR2 from 24.250 GHz to 52.6 GHz.

More specifically, any of the embodiment may be implemented in accordance with 3GPP RAN and/or a study item for NR Release 17 on supporting NR operation from 52.6 GHz to 71 GHz (e.g., according to 3GPP document RP-193259, "3GPP Work Item Description: Study on supporting NR from 52.6 GHz to 71 GHz", Intel Corporation, 3GPP TSG RAN Meeting #86, Dec. 9-12, 2019).

Embodiments can address at least one of the following objectives. As a first objective, embodiments can provide required changes to NR using existing DL/UL NR waveform to support operation between 52.6 GHz and 71 GHz. The embodiments can be applicable to different numerologies including subcarrier spacing and/or channel BW (e.g., including maximum BW). The embodiments can provide changes relative to FR2 physical layer design to support system functionality considering practical RF impairments.

As a second objective, embodiments can address potential critical problems to physical signal and/or channels, e.g. the spatial relation between the first and second physical channels.

As a third objective, by detecting a BF upon UL transmission, embodiments can reduce potential interference to/from other nodes, which may further improve the performance of a channel access mechanism assuming beam-based operation, e.g. in order to comply with the regulatory requirements applicable to unlicensed spectrum for frequencies between 52.6 GHz and 71 GHz.

The transmission or transmission attempt that is monitored in the step 306 may be configured by the radio access node 200 (for brevity: gNB 200), e.g., according to periodic and semi-persistent configurations. In NR the gNB 200 can configure the radio device 100 (for brevity: UE 100) with a number of periodic configurations. A periodic configuration can cover either an UL transmission occasion or a DL reception occasion. Periodic UL transmissions may be triggered due to at least one of the below purposes:
1) Scheduling Requests (SR);
2) periodic CSI reporting;
3) Sounding Reference Signals (SRS);
4) transmissions based on a configured grant (CG), which may also be referred to as grant-free scheduling, e.g. based on either Type 1 CG configuration or Type 2 CG configuration; and
5) Random Access (RACH).

An example of a periodic DL configuration, e.g., of the reception 302, is the DRX configuration, which determines during which time occasions the UE should monitor PDCCH.

In common for these periodic configurations, there is an agreement between the gNB 200 and UE 100 on when a transmission is expected. The offset (to some common time reference, e.g. system frame number 0) is either RRC configured or a relation to a DCI activating the semi-persistent configuration. The periodicity is always RRC configured.

As one example, the monitored transmission or transmission attempt in the step 306 may comprise a scheduling request. In NR, the scheduling request (SR) is used for requesting UL-SCH resources for new transmission. The UE 100 in connected mode may be configured with zero, one, or more SR configurations, with each SR configuration corresponding to one or multiple logical channels. An SR configuration consists of a set of PUCCH resources for SR across different BWPs and cells, also referred as SR resources in the standard. There is at most one SR resource assigned to a SR configuration in a BWP in a serving cell. An SR resource configuration includes a SR periodicity and time offset parameter (periodicityAndOffset) and a PUCCH resource ID. The SR periodicity and time offset parameter specifies the SR transmission occasions in time domain, and the PUCCH resource ID indicates which one of the PUCCH resources in the PUCCH configuration should be used for SR transmission.

As one example, the monitored transmission or transmission attempt in the step 306 may comprise a (e.g., periodic or semi-persistent) reporting of Channel State Information (CSI) on PUCCH.

The UE 100 may be configured with up to 48 CSI report configurations. The CSI report configuration contains a CSI-ReportPeriodicityAndOffset field and a PUCCH resource ID. With the CSI-ReportPeriodicityAndOffset field, the UE 100 is allowed to be jointly configured with the periodicity and corresponding slot offset for a specific PUCCH resource.

Any one of the transmission 302, the transmission 402 or the transmission (attempt) in the monitoring step 306 may be in mm-wave frequency, e.g., a beamforming centric transmission for NR operation.

As the operating frequency of a wireless network (including the RAN 600 and the radio devices 100) increases and moves to millimeter wavelengths (briefly: millimeter wave), data transmission (e.g., in any one of the steps 302, 402 and 306) between nodes (including the radio device 100 and the radio access node 200) suffers from high propagation loss, which is proportional to the square of the carrier frequency. Moreover, millimeter wave signal also suffers from high oxygen absorption, high penetration loss and a variety of blockage problems.

On the other hand, with the wavelength as small as less than a centimeter, it becomes possible to pack a large amount (tens, hundreds or even thousands) of antenna elements 101 and 201 into a single antenna array with a compact formfactor, e.g. which may be widely adopted in the radio access node 200 (e.g., as any network equipment) and the radio device (e.g. any user device). Such antenna arrays (e.g., antenna panels) can generate narrow beams (e.g., the beams 602 and/or 608) with high beam forming gain to compensate for the high path loss in mm-wave communications, as well as providing highly directional transmission and reception pattern. As a consequence, directional transmission and reception are the distinguishing characteristics for wireless networks in mm-wave bands. In addition, a transmitter/receiver can typically only transmit/receive in one or perhaps a few directions at any given time.

In any embodiment, the spatial relation may be a spatial relation for PUCCH as the second physical channel 608.

Release 15 of NR has introduced the concept of PUCCH-SpatialRelationInfo for PUCCH transmissions, which may be used in the step 306 to inform the UE 100 of the spatial filter 604, i.e., how to beamform using its transmitter antenna array 101.

For PUCCH 608, the UE 100 is configured with PUCCH-SpatialRelationInfo relations to other signals as the first physical channel 602. The other signals 602 can either be an SS/PBCH block (briefly referred to as SSB), a CSI-RS or an SRS, e.g., as defined in the 3GPP standard document TS 38.213, e.g. Version 16.1.0:

If PUCCH-SpatialRelationInfo provides ssb-Index, the UE transmits the PUCCH using a same spatial domain filter as for a reception of a SS/PBCH block with index provided by ssb-Index for a same serving cell or, if servingCellId is provided, for a serving cell indicated by servingCellId else if PUCCH-SpatialRelationInfo provides csi-RS-Index, the UE transmits the PUCCH using a same spatial domain filter as for a reception of a CSI-RS with resource index provided by csi-RS-Index for a same serving cell or, if servingCellId is provided, for a serving cell indicated by servingCellId else PUCCH-SpatialRelationInfo provides srs, the UE transmits the PUCCH using a same spatial domain filter as for a transmission of a SRS with resource index provided by resource for a same serving cell and/or active UL BWP or, if servingCellId and/or uplinkBWP are provided, for a serving cell indicated by serving-CellId and/or for an UL BWP indicated by uplinkBWP.

After configuring the UE 100 with a list of spatial relations, e.g., according to the step 304, the gNB 200 activates one of them using a MAC control element (MAC CE), e.g. as a realization of the control message 700 in the step 304.

The update will typically come as a response to that the UE 100 has reported a stronger received power for another reference signal (e.g., as an example for the first physical channel 602) than the one the current spatial relation is associated with. Thus, as the UE 100 moves around in a cell of the gNB 200, the UE 100 provides CSI report to the gNB 200, based on which the gNB 200 updates the currently active spatial relation.

In Release 16 for NR, an Enhanced PUCCH Spatial Relation Activation/Deactivation MAC CE as another example for the control message 700 is introduced, which allows the gNB 200 to update spatial relations for multiple PUCCH resources as examples for the second physical channel 608. Correspondingly, the space of Spatial Relation Info (SRI) ID 704 is extended from 8 to 64.

FIG. 7 schematically illustrates a MAC CE 700 as an embodiment of the control message. The control message 700 may configure the UE 100 to activate and/or deactivate certain spatial relations, e.g., the spatial relation for the PUCCH, optionally according to FIG. 6.1.3.25-1 in 3GPP document TS 38.321, "3GPP; TSG RAN; NR; Medium Access Control (MAC) protocol specification", V16.0.0.

In any embodiment, the spatial relation may be a spatial relation for PUSCH using Configured Grants as the second physical channel 608.

Two types of Configured Grant (CG) UL transmission schemes have been supported in NR since Release 15, referred as CG Type1 and CG Type2 in the standard. The major difference between these two types of CG transmission is that for CG Type1, an uplink grant is provided by RRC configuration and activated automatically, while in the case of CG Type2, the uplink grant is provided and activated via L1 signaling, i.e., by an UL DCI with CRC scrambled by CS-RNTI.

In both cases, the spatial relation used for PUSCH transmission with Configured Grant (as the second physical channel 608) is indicated by the uplink grant, either provided by the RRC configuration or by an UL DCI (as examples for the control message 700).

The uplink grant contains an srs-ResourceIndicator field (as an example for the control message 700), which is pointing to one of the SRS resources (as an example for the second physical channel 608) in the SRS resource configuration, which can be configured in-turn with the spatial relation to a DL RS (e.g., SSB or CSI-RS, as examples for the first physical channel 602) or another SRS resource (as examples for the first physical channel 602).

With the SRS resource indicator in the uplink grant and the RRC SRS resource configuration, PUSCH with Configured Grant (as an example for the second physical channel 602) is supposed to be transmitted with the same precoder or beamforming weights as the one used for the transmission of the reference SRS (as an example for the first physical channel 602).

In any embodiment, the spatial relation may be a spatial relation for PUSCH using dynamic Grants (as an example for the second physical channel 608).

For PUSCH transmission in NR, there are several possible configurations or modes, and when transmitting PUSCH in a beam management context. Two important options for a configuration of PUSCH as the second physical channel 608 include a codebook-based transmission and a non-codebook-based transmission in the step 306.

It is also possible to use a single-port transmission for PUSCH as the second physical channel 608 in the step 306. In this case, DCI format 0_0 may be used, and the UE 100 may use the same spatial relation (i.e., the same spatial filter 604) for PUSCH (i.e., the second physical channel 608) as for the PUCCH resource (as an example for the first physical channel 602), e.g., the PUCCH resource with the lowest ID. More advanced UEs 100 use 2-port UL MIMO.

For codebook-based or non-codebook-based transmission (attempt) in the step 306, the UE 100 would always transmit PUSCH using the same spatial properties (i.e., the same spatial filter 604 for the beam 608) as the transmission of an associated SRS resource (as an example of the first physical channel 602). The spatial properties of the associated SRS are configured using the RRC parameter SpatialRelationInfo (as an example for the configuration message 700).

For codebook-based transmission, the UE 100 determines its PUSCH transmission precoder based on at least one of the SRI (as an example for the configuration message 700), precoder and layer indication (TPMI and rank, TRI) fields from the DCI (as another example for the configuration message 700). SRI is only needed when more than one SRS resource is in the SRS resource set used for codebook based transmission. In this case, SRI selects an SRS resource from one of two SRS resources in the set, and this resource is used to determine the precoder. Otherwise, the single SRS resource in the set is used to determine the precoder. If the SRS resource has a valid spatial relation (indicated or configured), the UE applies that spatial relation to determine the TX beam for PUSCH. If the SRS resource does not have a valid (configured or indicated) spatial relation, the UE may transmit the SRS in any direction, and subsequent transmissions of PUSCH should use the SRS beam in the latest transmission. If the PUSCH transmission precoder is based on an SRI pointing to an SRS resource that has not been transmitted and has no a valid spatial relation, the UE may choose the PUSCH transmission precoder freely.

For non-codebook based transmissions, the UE 100 determines its PUSCH precoder and transmission rank (both being examples for the spatial filter) based on selecting one or more SRS resources (as an example for the second physical channel 608) by the SRI field 704 from the DCI (as an example for control message 700). Each SRS resource has a single antenna port in this case, so the number of selected resources equals the transmission rank.

Like for codebook-based transmissions, the SRI points to the latest transmission of the SRS resource (as an example for the first physical channel 602) with index SRI. Still, if the SRS resources are configured with spatial relations, the SRS resource can be indicated without a preceding transmission, since the UL TX beam is determined by the spatial relation anyway. For non-codebook based transmission, the UE 100 may be configured with a single SRS resource set, but with up to 4 SRS resources.

The spatial properties (i.e., the spatial filter 604) of the PUSCH transmission (as an example for the second physical channel 608) is controlled via the associated SRS resource (as an example for the first physical channel 602). In other words, PUSCH beam management is thus equivalent to SRS beam management. There is one exception to this rule: for UL data scheduled using DCI format 0_0. Since there is no SRI field 704 in DCI format 0_0 (as the control message 700), it has been decided that in this case, the PUSCH is transmitted using the same spatial relation as the PUCCH. In other words, the control message 700 is implicitly indicative of the spatial relation by virtue of the DCI format 0_0.

In any embodiment, the control message 700 may be implemented by a Transmission Configuration Indication (TCI) state switch and/or may be indicative of the spatial relation by being indicative of an active TCI state.

A UE 100 is configured by network node 200 (i.e., the radio access node) with one active Transmission Configuration Indication (TCI) state for physical downlink control channel (PDCCH) and physical downlink shared channel (PDSCH), respectively. The active TCI indicates for each of the channels which timing reference the UE 100 shall assume for the downlink reception. The timing reference may be with respect to an SSB index associated with a particular TX beam, or with respect to a particular DL-RS (downlink reference signals, e.g. channel state information reference signals—CSI-RS) resource configured by the network node and provided (i.e. transmitted) to the UE.

Implicitly, the active TCI state additionally indicates to the UE 100 which UE RX beam to use (e.g., as the definition of the spatial filter 604) when receiving PDCCH and/or PDSCH (as an example of the first physical channel 602), since the UE 100 shall use the RX beam (i.e., the spatial filter 604) that allows best conditions for receiving the SSB index or DL-RS resource (as examples of the first physical channel 602) associated with the TCI state. Note that the best UE RX beam 604 for a given TCI state may change over time, e.g., if the UE orientation changes, but also has to be relatively static at least over short time intervals.

Up to 8 TCI states can be configured for PDSCH via higher layer signaling (e.g., RRC signaling), but only one TCI state can be active at any time. In case several TCI states are configured by the network node, the network node indicates to the UE 100 via downlink control signaling (DCI) over PDCCH, which one of the pre-configured TCI states to activate for upcoming PDSCH reception(s).

The TCI state can be switched by the UE 100 based on received command via MAC, DCI or RRC messages etc. Upon receiving a TCI state command, the UE first sends HARQ feedback to the serving cell and switches active TCI state within certain delay.

For PDCCH, the overall process of applying TCI for this case may be implemented by at least one of the following TCI steps. In a first TCI step, a TCI State table (e.g., called 'tci-StatesToAddModList') is defined in PDSCH-Config. The max size of the table is 128. In a second TCI step, a subset of the tables from TCI State table (e.g., tci-StatesToAddModList) is selected and put into ControlResourceSet.tci-StatesPDCCH-ToAdd List. The max size of this table is 64. In a third TCI step, a specific TCI State defined in Step 2 via 'TCI State Indication for UE-specific PDCCH MAC CE' is applied.

There are roughly two cases for configuring TCI-State on the side of the UE 100. In a first case, tci-PresentInDCI=omit or PDSCH is scheduled by DCI 1_0. In the first case, the UE 100 uses the TCI state for CORESET and/or PDCCH as the TCI state for PDSCH. This means that the TCI state for PDSCH is the same as the TCI state for CORESET and/or PDCCH.

In a second case, tci-PresentInDCI=enabled. In the second case, the UE 100 uses the TCI indicated in DCI 1_1 following at least one of the below TCI steps. In a first TCI step, a TCI State table (e.g., called 'tci-StatesToAddModList') is defined in PDSCH-Config. The max size of the table is 128. In a second TCI step, a subset of the tables from TCI State table (e.g., tci-StatesToAddModList) is selected and put into a smaller table (e.g., called 'codepoint'). This is done by the 'TCI States Activation/Deactivation for UE-specific PDSCH MAC CE'. The max size of this table is 8. In a third step, for each PDSCH scheduling, the TCI field in DCI 1_1 indicates a specific index of the table defined in the second step.

Any of the embodiments can perform Beam Failure Detection (BFD), and when triggered, Beam Failure Recovery (BFR), in the step 308.

The gNB 200 can configure monitoring DL resources (e.g., periodic CSI-RS resources and/or SSBs) to check if the radio link can ensure connection between the gNB 200 and the UE 100. Those resources can be a set $\bar{q}_0$ containing CSI-RS resource configuration indexes and/or SSB indexes, configured by an RRC list (i.e., a higher layer parameter) called failureDetectionResources, e.g., according to 3GPP standard document TS 38.213, e.g. Version 16.1.0, preferably in Section 6. The failureDetectionResources is a list of reference signals (RS), pointed by their indexes, used for Radio Link Monitoring (RLM) purposes.

The SSB-based BFD is based on the SSB associated to the initial DL BWP and can only be configured for the initial DL BWPs and for DL BWPs containing the SSB associated to the initial DL BWP. For other DL BWPs, BFD can only be performed based on CSI-RS. The radio link quality is assessed by UE compared to thresholds. There is one out-of-sync (OOS) threshold $Q_{out,LR}$. According to 3GPP standard document TS 38.133, e.g., Version 16.3.0, preferably Section 8.5.1, the threshold $Q_{out,LR}$ is defined as the level at which the downlink radio level link of a given resource configuration on set T, cannot be reliably received and shall correspond to the BLERout=10% block error rate of a hypothetical PDCCH transmission.

BFD is implemented at the physical layer in UE 100 (e.g., as specified in, or as an extension of, the 3GPP standard document TS 38.213, e.g. Version 16.1.0, preferably in Section 6). The physical layer in the UE 100 provides an indication (also: beam failure indication) to higher layers (e.g., MAC or RRC) when the radio link quality for all corresponding resource configurations in the set $\bar{q}_0$ that the UE 100 uses to assess the radio link quality is worse than the threshold $Q_{out,LR}$. The indication is sent to the UE's MAC layer, where it is referred to as a beam failure instance.

As specified in the 3GPP standard document TS 38.321, e.g. Version 16.0.0, preferably clause 5.1.17, the MAC entity (e.g., of the UE 100) may be configured by RRC per Serving Cell with a beam failure recovery (BFR) procedure, which is used for indicating to the serving gNB 200 of a new SSB or CSI-RS (as examples of the first physical channel) when beam failure is detected on the serving SSB(s) and/or CSI-RS(s).

Beam failure (BF) may be detected in the step 308 by counting beam failure instance indication from the lower layers to the MAC entity. In contrast or in addition to existing BFD, the failure instance indications may comprise the result of the monitoring step 306 (e.g., for the UL).

If beamFailureRecoveryConfig is reconfigured by upper layers during an ongoing Random Access (RA) procedure for beam failure recovery for SpCell, the MAC entity shall stop the ongoing Random Access procedure and initiate a Random Access procedure using the new configuration.

RRC may configure at least one of the following parameters in the BeamFailureRecoveryConfig and the RadioLinkMonitoringConfig for the BFD procedure in the step 308 (optionally comprising the BFR procedure).
  beamFailureInstanceMaxCount for the BFD;
  beamFailureDetectionTimer for the BFD;
  beamFailureRecoveryTimer for the beam failure recovery procedure;
  rsrp-ThresholdSSB: an RSRP threshold for the beam failure recovery;
  powerRampingStep: powerRampingStep for the beam failure recovery;
  powerRampingStepHighPriority: powerRampingStepHighPriority for the beam failure recovery;
  preambleReceivedTargetPower: preambleReceivedTargetPower for the beam failure recovery;
  preambleTransMax: preambleTransMax for the beam failure recovery;
  scalingFactorBI: scalingFactorBI for the beam failure recovery;
  ssb-perRACH-Occasion: ssb-perRACH-Occasion for the beam failure recovery;
  ra-ResponseWindow: the time window to monitor response(s) for the beam failure recovery using contention-free Random Access Preamble;
  prach-ConfigurationIndex: prach-ConfigurationIndex for the beam failure recovery;
  ra-ssb-OccasionMaskIndex: ra-ssb-OccasionMaskIndex for the beam failure recovery;
  ra-OccasionList: ra-OccasionList for the beam failure recovery.

A counter for beam failure instance indication (e.g., as UE variable of the UE 100) may be used (e.g., incremented) in the BFD of the step 308. The counter may be referred to by BFI COUNTER. The counter may be initially set to 0. For example, each failure of a transmission or transmission attempt (according to the result of the monitoring 306) may increment the counter (e.g., by one). The BFR may be trigged, if the counter exceeds a predefined or configured threshold (e.g., before the counter is reset to 0 after a predefined or configured time period).

Alternatively or in addition, the MAC entity of the UE 100 shall for each Serving Cell configured for BFD perform at least one of the following steps:
  1>if beam failure instance indication has been received from lower layers:
    2>start or restart the beamFailureDetectionTimer;
    2>increment BFI COUNTER by 1;
    2>if BFI COUNTER>=beamFailureInstanceMaxCount:
      3>if the Serving Cell is SCell:
        4>trigger a BFR for this Serving Cell;
      3>else:
        4>initiate a Random Access procedure on the SpCell.
  1>if the beamFailureDetectionTimer expires; or
  1>if beamFailureDetectionTimer, beamFailureInstanceMaxCount, or any of the reference signals used for BFD is reconfigured by upper layers associated with this Serving Cell:
    2>set BFI COUNTER to 0.
  1>if the Serving Cell is SpCell and the Random Access procedure is successfully completed:
    2>set BFI COUNTER to 0;
    2>stop the beamFailureRecoveryTimer, if configured;
    2>consider the Beam Failure Recovery procedure successfully completed.
  1>else if the Serving Cell is SCell, and a PDCCH addressed to C-RNTI indicating uplink grant for a new transmission is received for the HARQ process used for the transmission of the SCell BFR MAC CE or truncated SCell BFR MAC CE which contains beam failure recovery information of this Serving Cell; or
  1>if the SCell is deactivated as specified in clause 5.9:
    2>set BFI COUNTER to 0;
    2>consider the Beam Failure Recovery procedure successfully completed and cancel all the triggered BFRs for this Serving Cell.

Alternatively or in addition, the MAC entity of the UE 100 shall:
  1>if the Beam Failure Recovery procedure determines that at least one BFR has been triggered and not cancelled:
    2>if UL-SCH resources are available for a new transmission:
      3>if the UL-SCH resources can accommodate the SCell BFR MAC CE plus its subheader as a result of LCP:
        4>instruct the Multiplexing and Assembly procedure to generate the SCell BFR MAC CE.
      3>else if the UL-SCH resources can accommodate the truncated SCell BFR MAC CE plus its subheader as a result of LCP:
        4>instruct the Multiplexing and Assembly procedure to generate the truncated SCell BFR MAC CE.
    2>else:
      3>trigger the SR for SCell beam failure recovery.

Any embodiment may provide beamforming transmission or reception in the step 302 and/or beamforming transmission in the step 306, e.g., for NR operation in mm-wave bands. For UL transmission in the step 306, the spatial relation may be used according to the control message 700 exchanged between the UE 100 and the gNB 200 before the transmission in the UL is performed or attempted.

The spatial relation may be defined between the second physical channel 608 as an UL channel and/or UL reference signal (e.g., PUCCH or PUCCH or SRS) and a first physical channel 602 being either a DL reference signal (e.g., CSI-RS or SS/PBCH block) or another UL reference signal (e.g., SRS). If the UL channel or UL signal A (as the second physical channel 608) is spatially related according to the control message 700 to reference signal B (as the first physical channel 602), the UE 100 should beamform A in the step 306 in the same way as the UE 100 received and/or transmitted B in the step 302.

By establishing the spatial relation, the UE 100 gets to know in which direction 604 to beamform its transmission signal towards the targeted gNB 200 in the step 306, and the gNB 200 also understands how to configure its RX beam 606 towards the UE 100 in the step 406.

In contrast to the existing BFD, the UE 100 does not or not only assess the DL radio link quality (e.g., for all configured monitoring resources) compared to a threshold $Q_{out,LR}$. Alternatively or in addition, the UE 100 takes the result of monitoring 306 an UL transmission or transmission attempt into account for BFD according to the step 308.

Conventionally, a beam failure instance (BFI) is triggered, if the measured radio link quality of all configured monitoring resources is below the threshold $Q_{out,LR}$.

According to the step 308, the BFD procedure (or briefly BFD) comprises a triggering input (for the BFD) from UL transmissions or UL transmission attempts. For example, the UE 100 may experience different beam failure cases during the UL transmissions or UL transmission attempt.

As a first case, interference or congestion (e.g., greater than a threshold) may be detected on the selected uplink beam 608. In this case, after transmission of an uplink control signaling (such as a scheduling request on PUCCH, a periodic CSI report on PUCCH), there is no response from the gNB received at the UE. After transmission of a PUSCH (using a dynamic grant or a configured grant), gNB replies with a NACK to request a retransmission.

An example situation for the first case is schematically illustrated in FIG. 6B.

As a second case, the uplink beam 608 (i.e., the filter 604 used for transmitting on the second physical channel 608) may be misaligned, e.g., relative to the position of the gNB 200 or the direction of the corresponding filter 606 at the gNB 200 (which is briefly referred to as UL beam misalignment between gNB and UE).

The gNB 200 with analog beamforming capability (e.g., analog phase shifts between antenna elements 201) can only listen to UL transmission in the step 406 in one direction (per antenna panel) at a time. To solve this, the gNB 200 may periodically sweep through all beams in the cell for periodic UL transmission in relevant transmission occasions. Periodic UL transmission resources for multiple UEs 100 can be configured in same OFDM symbol(s) by means of frequency or code multiplexing to improve resource efficiency.

The gNB 200 with analog beamforming capability should multiplex periodic UL transmission resources in the same time occasion only for UEs 100 located in the same beam coverage area, so that the gNB 200 can receive the periodic UL transmissions from the UEs with the same RX beam. In other words, in case there are simultaneous SR transmissions by UEs 100 from different directions, it would be difficult for the gNB to decode all directions due to the analog beamforming capability limitation. In case of SR transmission, a UE 100 which fails to receive the grant would retransmit the SR at next time occasions which cause extra latency.

In an extreme case, a PUCCH-SR failure may be triggered due to that UE 100 has reached the maximum transmission attempts for an SR configuration, which would trigger the UE to perform RACH. This would lead to even longer latency to the UE to get a grant. When the UEs 100 are moving around in the cell across different beam coverage area, gNB 200 needs to frequently re-configure periodic UL transmission resources for the UEs by dedicated signaling (i.e., RRC, MAC CE or DCI). However, an accurate beam alignment requires not only that the UE 100 provides its CSI report in time, but also requires the gNB 200 to send signaling (as an example for the first physical channel 602, e.g., the CSI-RS) in time. This is not always feasible, e.g., when the UE 100 moves fast and/or there is high signaling load in the cell.

An example situation for the second case is schematically illustrated in FIG. 6C. When either of the above two cases happens, the probability of the UL transmission or transmission attempt in the step 306 being not heard by the gNB 200 can be very high.

A conventional consequence would be that the UL transmission suffers from low reliability or high transmission latency (e.g., due to excessive re-transmissions). Accordingly, for NR operation in mm-wave bands, the existing BFD procedure is not efficient in terms of uplink beam failure handling. The technique provides a solution to improve the BFR procedure. By taking the failure of the UL transmission or transmission attempt into account when performing BFD according to the step 308, the BF can be detected earlier.

Any embodiment may, e.g., for NR operation in mm-wave bands, replace or extend the existing BFD procedure by taking at least one of uplink beam failure and beam misalignment into account according to the step 308 based on the result of the step 306.

For UL beam failure, the UE 100 monitors in the step 306 at least one of the below failure occurrences during UL transmissions on one or multiple active serving beams 608:

Retransmissions of any uplink transmission such as PUSCH, or PUCCH, or SRS, or RACH etc. have reached a configured maximum number however, there is no positive acknowledgement or even any acknowledgement/response received.

Retransmissions of any uplink transmission have reached a configured maximum time period however, there is no positive acknowledgement or even any acknowledgement/response received.

Other measurement quantities for the uplink transmissions are below a configured threshold for a configured time period, for example in terms of for example, RSRP, RSRQ, RSSI, SINR or channel occupancy or LBT failure statistics (e.g., number of LBT failures, ratio of LBT failure/success etc.), transmission power etc.

Some measurement results are not directly measured by the UE.

Therefore, the other node such as the gNB may forward its measurements to the UE.

For a UE 100, the gNB 200 may detect or estimate degradation of the radio channel quality of the serving beams or misalignment of beams. The gNB signals to the UE of the relevant information to assist the UE to trigger beam failure events. The information may be signaled in system information, RRC signaling, MAC CE or DCI.

The gNB 200 may decide to not change the serving beam for a UE, upon reception of a message from the UE for reporting a BF event. Instead, the gNB may reconfigure the UL or DL configurations to the UE to mitigate the failures on the current serving beams. This is the case especially when the failures were caused by beam misalignment.

The below-mentioned embodiments may be implemented independently and/or by a subset of the below features. Alternatively any of the afore-mentioned embodiments by be extended by any one of the below-mentioned embodiments.

Furthermore, the term beam failure or beam failure (BF) event or beam failure instance may be used synonymously.

By way of example, if at least one BF event is declared in the step 308, the UE 100 may perform BFR.

Below embodiments are not restricted by terms. Any similar term is equally applicable here. Moreover, the proposed embodiments are applicable to both licensed and unlicensed operations.

As a first embodiment, in case UE 100 is configured in a Serving Cell with a beam failure detection (BFD) and beam failure recovery (BFR) procedure, uplink beam failure instances are considered into the existing BFD procedure. In other words, a beam failure (BF) event is triggered not only counting a downlink beam failure instances (i.e., when the BLER of a (hypothetical) PDCCH is above a threshold for a certain time), but also counting uplink beam related failure instances. In this case, the existing BFD counters and timers may serve for this combined monitoring purpose. Alternatively, additional timers and counters may be introduced specifically for monitoring uplink beam failure instances. Upon triggering of a BF event based on combined monitoring (i.e., both DL beam failure instances and UL beam failure instances), the UE would trigger the BFR procedure.

For UL, UE 100 monitors in the step 306 at least one of the below failure occurrences during uplink transmissions or transmission attempts on one or multiple active serving beams:
  a. Retransmissions of any uplink transmission have reached a configured maximum number.
    A retransmission may be triggered at upper layer such as (RLC or PDCP, or TCP).
    A retransmission may be triggered at lower layer such as HARQ, or PHY layer (such as TB repetitions).
    Any uplink transmission such as PUSCH, or PUCCH, or SRS, or RACH etc. is considered.
  b. Retransmissions of any uplink transmission have reached a configured maximum time period however, there is no positive acknowledgement or even any acknowledgement/response received.
    Acknowledgement or response may mean different thing for different uplink transmissions. As non-limiting examples,
      In case PUSCH, it is a HARQ acknowledgement (ACK or NACK).
      In case PUCCH, it is a DL resource assignment or an UL grant.
      For any uplink transmission, the response may be an RRC signaling or a MAC CE to trigger UE actions.
  c. other measurement quantities for the uplink transmissions are below a configured threshold for a configured time period, for example in terms of RSRP, RSRQ, RSSI, SINR or channel occupancy or LBT failure statistics (e.g., number of LBT failures, ratio of LBT failure/success etc), transmission power etc. Some measurement results are not directly measured by the UE. Therefore, the other node such as the gNB may forward its measurements to the UE according to the supporting step 406.

For any above monitoring action, separate counters or a combined counter may be defined accordingly. The counters may be for consecutive failures (failures for consecutive transmissions) and/or for any of consecutive and non-consecutive failures; a counter for consecutive failures is restarted with every non-consecutive failure or with every successful transmission after the last counted failure. In addition, for detection of failures, several timers for different purposes may be defined. In one example, a timer is introduced for monitoring the interval of two consecutive failure instances. The timer is started and restarted whenever a failure instance is detected. When the timer is expired, the counter of failures can be reset to zero.

All thresholds herein may be any of: pre-defined, pre-configured, configured by another node (e.g., a network node), determined based on a pre-defined rule or table (e.g., a certain threshold configuration depending on a condition), etc. All timers and counters may be stopped/reset in case the UE has recovered from the declared failure event or the UE has received reconfiguration signaling for the failure detection and recovery.

Alternatively, UE 100 may monitor in the step 306 any one of above beam failure instances in uplink transmission and any BF instances in the DL in a combined fashion or separately.

In one example, a BF event is declared and a BFR is triggered for the corresponding serving cell if the counter summarizing the number of BF instances (summarizing both UL failure instances and DL failure instances) has reached a configured threshold.

In one example, a BF event is declared and a BFR is triggered for the corresponding serving cell if the separate counter for UL failure instances has reached a configured threshold regardless if the counter of DL BF instances has reached another configured threshold.

In any embodiment, upon triggering of a BFR, the UE 100 may take at least one of the below BF actions to report occurrence of the beam failure event on the current serving beams, and optionally also to indicate potential candidate new beams.

According to a first BF action, the UE 100 initiates a RACH procedure using a different beam and/or a different SSB (e.g., a spatial filter other than the spatial filter used in the step 306).

In a first variant, a 4-step RA based RACH procedure can be triggered to indicate the failure event.

In an example, Msg1 is used to identify the failure event. Dedicated preambles or dedicated RACH occasions may be allocated to the UE for indicating the failure event. The allocation may be pre-defined, determined based on a pre-defined rule, or configured by another node.

In an example, Msg3 is extended to identify the failure event. In Msg3, the UE MAC entity adds an indicator indicating the failure event. The indicator may be a field in the MAC subheader or carried in a MAC CE.

In a second variant, a 2-step RA based RACH procedure can be triggered to indicate the failure event. Dedicated preambles or dedicated RACH occasions or dedicated PUSCH occasions/resources may be allocated to the UE for indicating the failure event. Alternatively, an indicator indicating the failure event can be included in MsgA payload. The indicator may be a field in the MAC subheader or carried in a MAC CE.

Alternatively, an RRC message (partly or fully) may be included in a RACH message, which includes an indicator of the failure event.

According to a second BF action, the UE 100 initiates a PUCCH transmission using a different beam and/or a different SSB (e.g., a spatial filter other than the spatial filter used in the step 306). For indicating the failure event, separate dedicated PUCCH resources may be configured accordingly.

According to a third BF action, the UE 100 initiates a configured grant based transmission using a different beam and/or a different SSB (e.g., a spatial filter other than the spatial filter used in the step 306). For indicating the failure event, separate dedicated configured grant resources may be configured accordingly.

According to a fourth BF action, the UE 100 initiates an SRS transmission or CSI report transmission using a different beam and/or a different SSB (e.g., a spatial filter other than the spatial filter used in the step 306). For indicating the failure event, separate dedicated SRS and/or CSI report resources may be configured accordingly.

In one example, for the resources used for the BFR, the resources are configured via an RRC signaling. In another example, the resources are signaled using a MAC CE or a DCI.

As a second embodiment, upon declaration of the BF event, UE 100 may not perform a recovery action. Instead, UE 100 may rely on the ordinary PUCCH-CSI report containing CSI measurements of the current serving beams and also other non-serving beams. Upon reception of the PUCCH-CSI report, gNB may figure out that UE is suffering from bad channel radio connection on its serving beams or beam misalignment. UE may also adjust PUCCH-CSI reporting frequency if it is necessary.

In one case, UE switches to more frequent PUCCH-CSI measure and report upon detection of one or multiple beam failure instances in either UL or DL.

In another case, UE switches to more frequent PUCCH-CSI measure and report when its current serving beam is becoming weaker in terms of measured quality such as RSRP, RSRQ, RSSI, or SINR or uplink transmission power.

In other cases, UE 100 switches to less frequent PUCCH-CSI measure and report when UE doesn't detect or experience any above case.

Instead, UE may also rely on other measurement report such as measurement report containing beam/TCI state level measurements in terms of RSRP, RSRQ, RSSI, SINR or channel occupancy or LBT failure statistics (e.g., number of LBT failures, ratio of LBT failure/success etc.). These measurement reports can assist the gNB to figure out that UE is suffering from bad channel radio connection or channel unavailability in the reported beams/TCI states.

Any of the above report messages may be transmitted in the same BWP and/or physical channel and/or cell and/or carrier, in which the failure events are being monitored or triggered (e.g., in the step 306) or in a different serving BWP and/or channel and/or cell and/or carrier.

As third embodiment, for a UE 100, the gNB 200 may detect or estimate degradation of the radio channel quality of the serving beams or misalignment of beams. The gNB signals to the UE of the relevant information to assist the UE to trigger beam failure events. The information may be signaled in system information, RRC signaling, MAC CE or DCI.

As a fourth embodiment, for any above embodiment, upon detection of failure events, the UE 100 may send a report message to the gNB 200 or log and/or save such a report (e.g., which may be sent later). The report message indicates at least one of below failure events/reasons 1) Failure event (e.g., BF event) caused by DL consecutive BF instances or beam misalignment instances
2) Failure event (e.g., BF event) caused by UL consecutive BF instances or beam misalignment instances
3) Failure event (e.g., BF event) caused by consecutive UL and DL BF instances or beam misalignment instances The report message may include one or multiple of below information such as 1) Ratio of UL or DL BF instances or beam misalignment instances
2) Number of BF instances or beam misalignment instances.

The report message may also include the information indicating candidate beams which are preferred by the UE, such as 1) Indices of SSBs or SSB groups,
2) Indices of CSI-RS resources associated with the beams
3) Indices of SRS resources associated with the beams
4) Indices of the TCI states associated with the beams Alternatively or in addition, the report message may carry the index or information on the one or more beams that have detected the failures.

Alternatively or in addition, the report message may carry one or more radio quality measurement results of other beams or SSBs, so that the gNB 200 may select a candidate beam or SSB for the UE 100 based on the measurement results.

As a fifth embodiment, the gNB replies with acknowledgement upon reception of the report message indicating failure events from a UE. The acknowledgement may be indicated via at least one of below signaling means:

1) a DCI for example, the DCI addressed to the C-RNTI associated with the UE;
2) an RRC signaling;
3) a MAC CE.

The gNB 200 may also provide further signaling to UE on:

1) beam/TCI state that the UE should use for subsequent transmissions or receptions;
2) Switch to a different BWP from the BWP in which UE has detected failures;
3) Deactivate or reconfigure the corresponding serving cell in which UE has detected failures;
4) Switch to a different serving cell.

In addition, the gNB 200 may decide to not change the serving beam for a UE 100, upon reception of a message from the UE 100 for reporting a BF event. Instead, the gNB may reconfigure the UL or DL configurations to the UE to mitigate the failures on the current serving beams. This is the case especially when the failures were caused by beam misalignment.

As a sixth embodiment, for any above embodiment, the gNB configures the UE how to detect UL beam failures or beam misalignment and how to perform recovery actions. The configuration is signaled via system information, dedicated RRC signaling, MAC CE or DCI. The configuration may also comprise configuration of one or more timers, counters, or thresholds associated with the failure detection.

As a seventh embodiment, a corresponding UE capability bit indicating whether UE supports detection and recovery of UL beam failures or misalignment is defined.

As a eighth embodiment, a corresponding UE capability is defined to indicate UE's ability to trigger beam failure event caused by beam failure or beam misalignment instances during uplink transmissions (when not all UE have such ability). One example UE without such capability would operate the BFD and recovery procedure without directly considering the beam failure instances or beam misalignment instances during uplink transmission.

Figure 8:
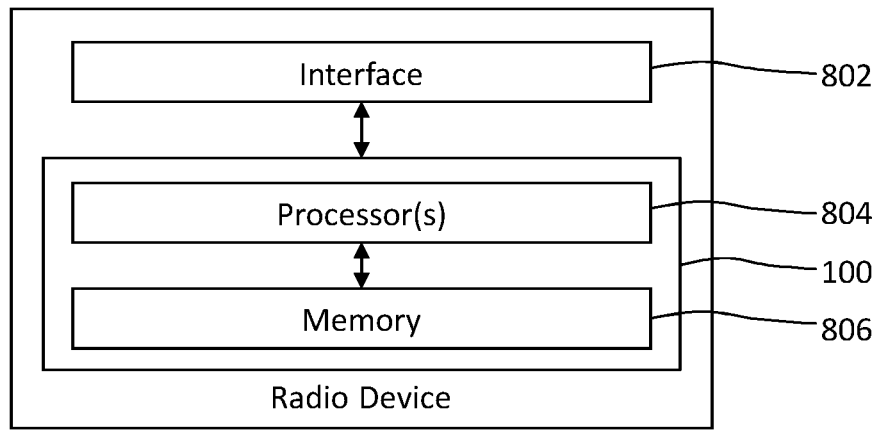
FIG. 8 shows a schematic block diagram of a radio device embodying the device of FIG. 1.

FIG. 8 shows a schematic block diagram for an embodiment of the device 100. The device 100 comprises one or more processors 804 for performing the method 300 and memory 806 coupled to the processors 804. For example, the memory 806 may be encoded with instructions that implement at least one of the modules 102, 104 and 106.

The one or more processors 804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 806, UE functionality. For example, the one or more processors 804 may execute instructions stored in the memory 806. Such functionality may include providing various features and steps discussed herein, including any of the benefits disclosed herein. The expression "the device being operative to perform an action" may denote the device 100 being configured to perform the action.

As schematically illustrated in FIG. 8, the device 100 may be embodied by a radio device 800, e.g., functioning as a UE. The transmitting station 800 comprises a radio interface 802 coupled to the device 100 for radio communication with one or more receiving stations, e.g., functioning as a receiving base station or a receiving UE.

Figure 9:
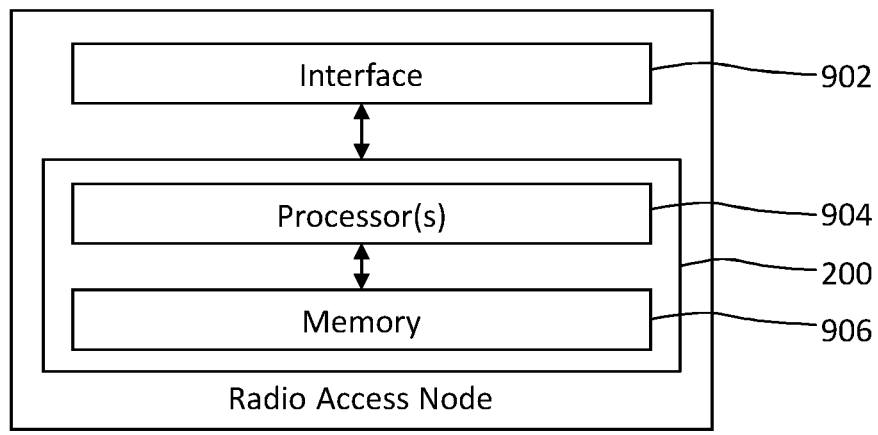
FIG. 9 shows a schematic block diagram of a radio access node embodying the device of FIG. 2.

FIG. 9 shows a schematic block diagram for an embodiment of the device 200. The device 200 comprises one or more processors 904 for performing the method 400 and memory 906 coupled to the processors 904. For example, the memory 906 may be encoded with instructions that implement at least one of the modules 202, 204 and 206.

The one or more processors 904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 906, gNB functionality. For example, the one or more processors 904 may execute instructions stored in the memory 906. Such functionality may include providing various features and steps discussed herein, including any of the benefits disclosed herein. The expression "the device being operative to perform an action" may denote the device 200 being configured to perform the action.

As schematically illustrated in FIG. 9, the device 200 may be embodied by a radio access node 900, e.g., functioning as a base station. The receiving station 900 comprises a radio interface 902 coupled to the device 200 for radio communication with one or more transmitting stations, e.g., functioning as a transmitting base station or a transmitting UE.

Figure 10:
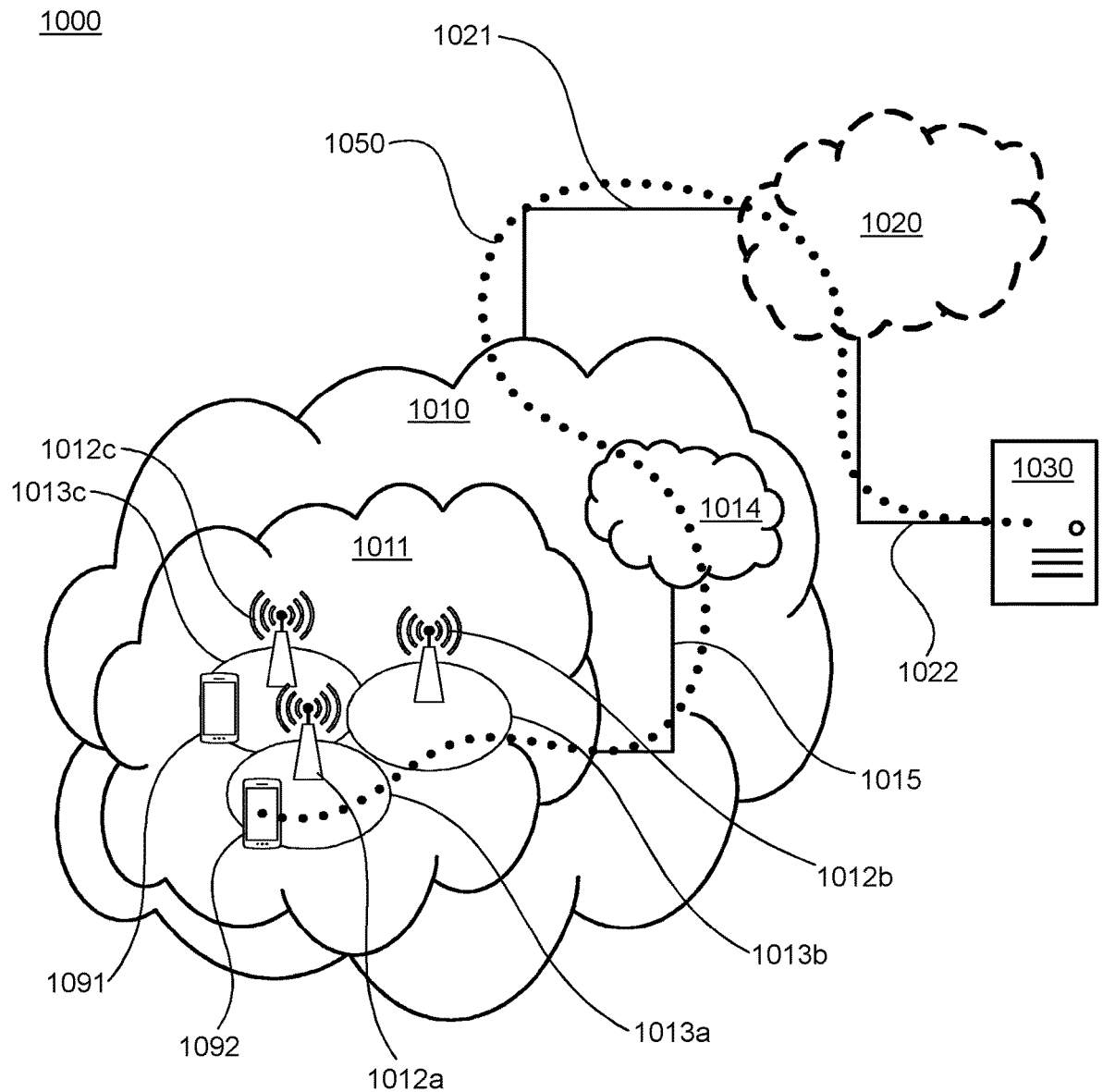
FIG. 10 schematically illustrates an example telecommunications network connected via an intermediate network to a host computer.

With reference to FIG. 10, in accordance with an embodiment, a communication system 1000 includes a telecommunication network 1010, such as a 3GPP-type cellular network, which comprises an access network 1011, such as a radio access network, and a core network 1014. The access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to the core network 1014 over a wired or wireless connection 1015. A first user equipment (UE) 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Any of the base stations 1012 and the UEs 1091, 1092 may embody the device 100.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider, or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 1020 may be one of, or a combination of more than one of, a public, private or hosted network; the intermediate network 1020, if any, may be a backbone network or the Internet; in particular, the intermediate network 1020 may comprise two or more sub-networks (not shown).

The communication system 1000 of FIG. 10 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signaling via the OTT connection 1050, using the access network 1011, the core network 1014, any intermediate network 1020 and possible further infrastructure (not shown) as intermediaries. The OTT connection 1050 may be transparent in the sense that the participating communication devices through which the OTT connection 1050 passes are unaware of routing of uplink and downlink communications. For example, a base station 1012 need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

By virtue of the method 200 being performed by any one of the UEs 1091 or 1092 and/or any one of the base stations 1012, the performance of the OTT connection 1050 can be improved, e.g., in terms of increased throughput and/or reduced latency. More specifically, the host computer 1030 may indicate the AC 302 for the user data being a piece of the data in the multi-layer transmission 208.

Example implementations, in accordance with an embodiment of the UE, base station and host computer discussed in the preceding paragraphs, will now be described with reference to FIG. 11. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data, which is transmitted using the OTT connection 1150. The user data may depend on the location of the UE 1130. The user data may comprise auxiliary information or precision advertisements (also: ads) delivered to the UE 1130. The location may be reported by the UE 1130 to the host computer, e.g., using the OTT connection 1150, and/or by the base station 1120, e.g., using a connection 1160.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 11) served by the base station 1120. The communication interface 1126 may be configured to facilitate a connection 1160 to the host computer 1110. The connection 1160 may be direct, or it may pass through a core network (not shown in FIG. 11) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station 1120 further has software 1121 stored internally or accessible via an external connection.

The communication system 1100 further includes the UE 1130 already referred to. Its hardware 1135 may include a radio interface 1137 configured to set up and maintain a wireless connection 1170 with a base station serving a coverage area in which the UE 1130 is currently located. The hardware 1135 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1132. The client application 1132 may be operable to provide a service to a human or non-human user via the UE 1130, with the support of the host computer 1110. In the host computer 1110, an executing host application 1112 may communicate with the executing client application 1132 via the OTT connection 1150 terminating at the UE 1130 and the host computer 1110. In providing the service to the user, the client application 1132 may receive request data from the host application 1112 and provide user data in response to the request data. The OTT connection 1150 may transfer both the request data and the user data. The client application 1132 may interact with the user to generate the user data that it provides.

Figure 11:
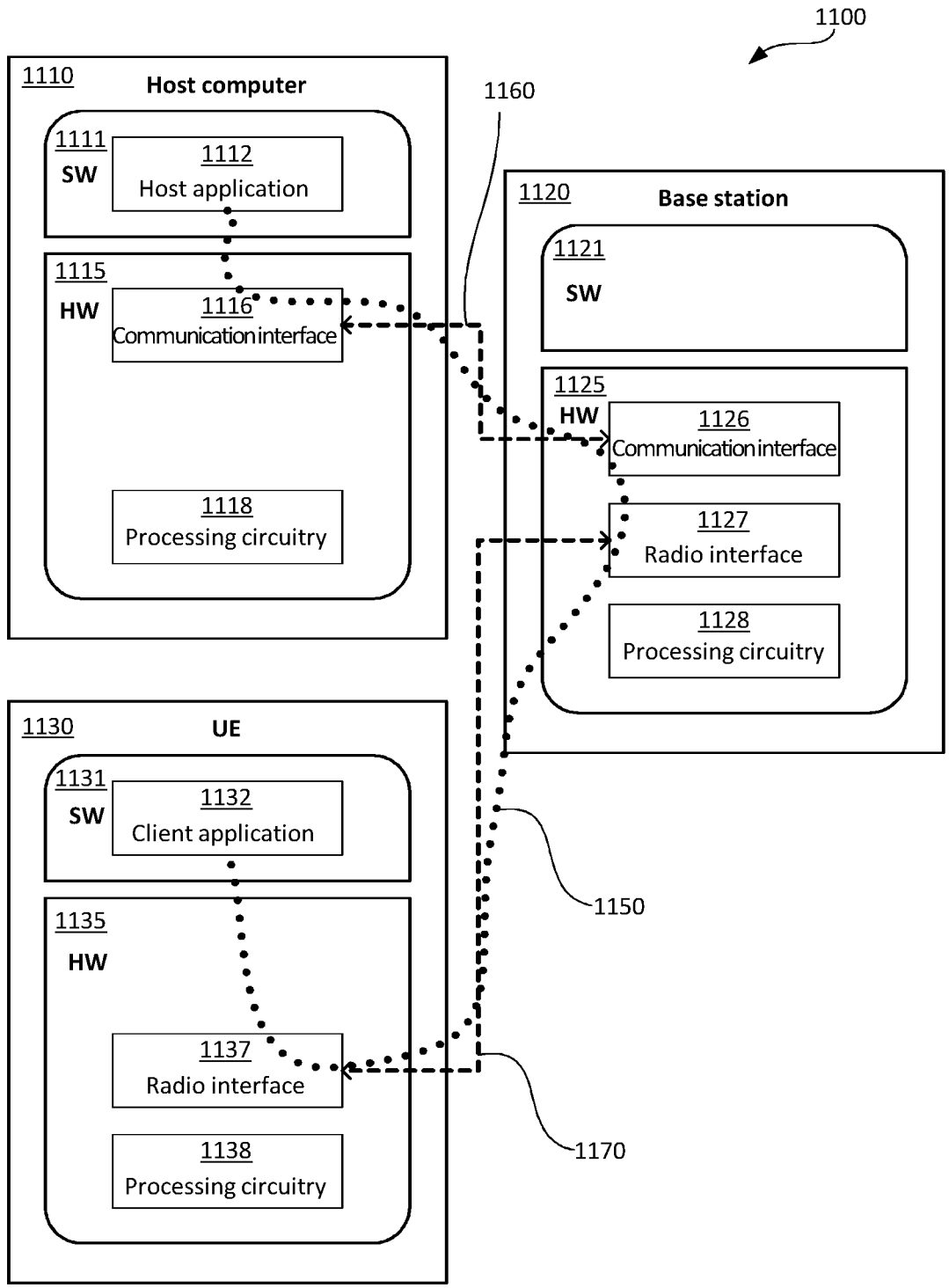
FIG. 11 shows a generalized block diagram of an embodiment of a host computer communicating via a base station as the radio access node with a user equipment as the radio device over a partially wireless connection.

It is noted that the host computer 1110, base station 1120 and UE 1130 illustrated in FIG. 11 may be identical to the host computer 1030, one of the base stations 1012*a*, 1012*b*, 1012*c* and one of the UEs 1091, 1092 of FIG. 10, respectively. This is to say, the inner workings of these entities may be as shown in FIG. 11, and, independently, the surrounding network topology may be that of FIG. 10.

In FIG. 11, the OTT connection 1150 has been drawn abstractly to illustrate the communication between the host computer 1110 and the UE 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network).

The wireless connection 1170 between the UE 1130 and the base station 1120 is in accordance with the teachings of the embodiments described throughout this disclosure. One or more of the various embodiments improve the performance of OTT services provided to the UE 1130 using the OTT connection 1150, in which the wireless connection 1170 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signaling facilitating the host computer's 1110 measurements of throughput, propagation times, latency and the like. The measurements may be implemented in that the software 1111, 1131 causes messages to be transmitted, in particular empty or "dummy" messages, using the OTT connection 1150 while it monitors propagation times, errors etc.

Figures 12, 13:
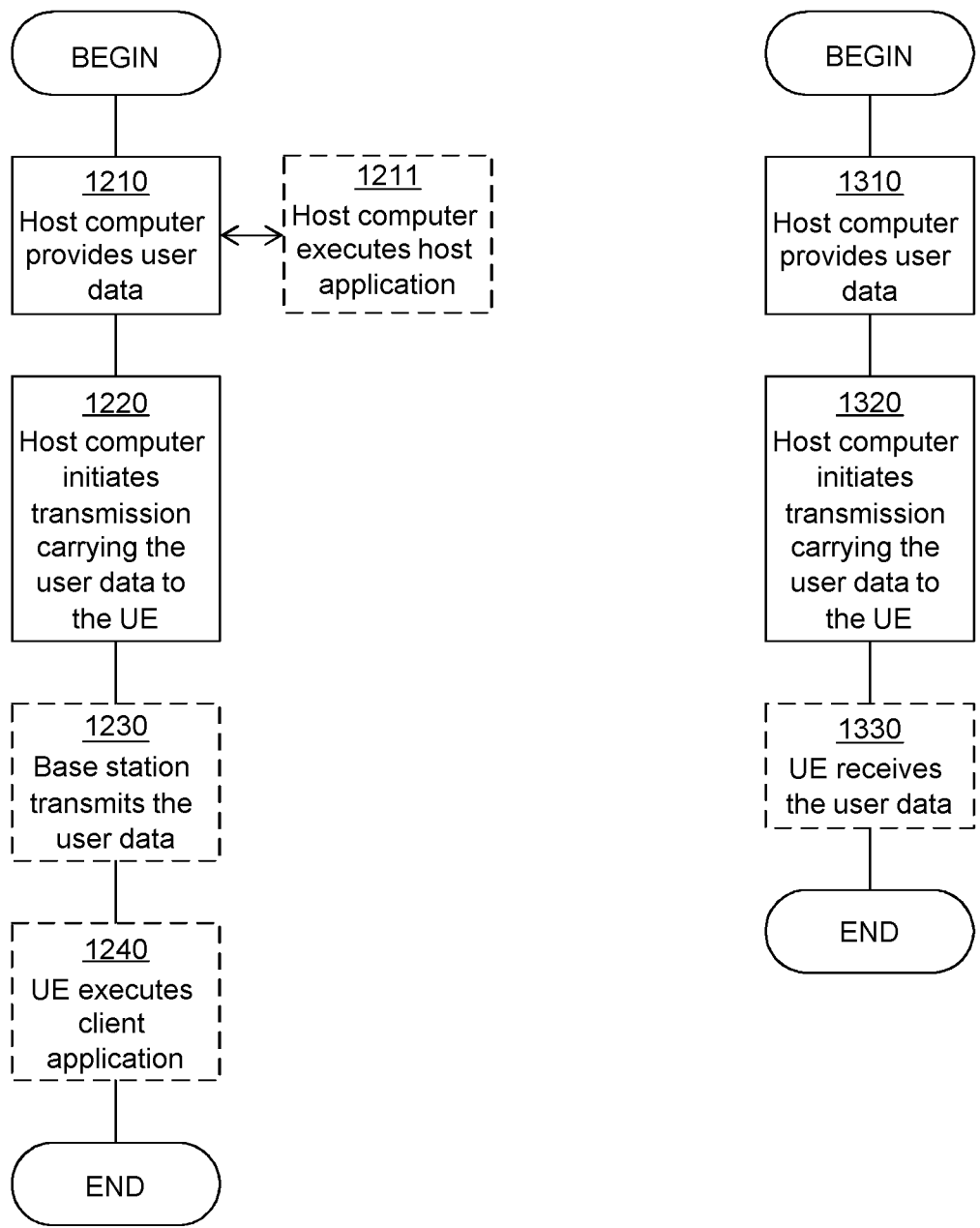
FIGS. 12 and 13 show flowcharts for method embodiments implemented in a communication system including a host computer, a base station as the radio access node and a user equipment as the radio device.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this paragraph. In a first step 1210 of the method, the host computer provides user data. In an optional substep 1211 of the first step 1210, the host computer provides the user data by executing a host application. In a second step 1220, the host computer initiates a transmission carrying the user data to the UE. In an optional third step 1230, the base station transmits to the UE the user data which was carried in the transmission that the host computer initiated, in accordance with the teachings of the embodiments described throughout this disclosure. In an optional fourth step 1240, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this paragraph. In a first step 1310 of the method, the host computer provides user data. In an optional substep (not shown) the host computer provides the user data by executing a host application. In a second step 1320, the host computer initiates a transmission carrying the user data to the UE. The transmission may pass via the base station, in accordance with the teachings of the embodiments described throughout this disclosure. In an optional third step 1330, the UE receives the user data carried in the transmission.

As has become apparent from above description, embodiments of the technique allow for supporting more reliable and consistent TCI state switching. Same or further embodiments can reduce the impact of UL beam failure or UL beam misalignment on beam management. Same or further embodiments can reduce the occurrence of miss-triggering of beam failures. Same or further embodiments can reduce the delay for UL data transmission.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention may be implemented according to and/or should be limited only by the scope of the following claims.

The invention claimed is:

1. A method, performed by a radio device, the method comprising:
   receiving a control message from a radio access network (RAN), the control message indicating a spatial relation between a first physical channel and a second physical channel;
   monitoring a transmission or transmission attempt to a radio access node on the second physical channel, the transmission or transmission attempt using a filter in the spatial domain configured for the first physical channel according to the spatial relation;
   determining that a result of the monitoring indicates a failure of the transmission or transmission attempt by indicating:
      interference and/or congestion on the second physical channel; or
      that a contention-based protocol or a listen-before talk protocol has failed or indicates that the second physical channel is occupied, wherein the transmission or transmission attempt on the second physical channel comprises the contention-based protocol or the listen-before talk protocol; and
   performing Beam Failure Detection (BFD) for a radio beam between the radio device and the radio access node based on the result of the monitoring.

2. The method of claim 1, wherein responsive to the result of the monitoring indicating a failure of the transmission or the transmission attempt, performing the BFD comprises:
   indicating, from a physical layer to a medium access control layer in a protocol stake of the radio device, a beam failure (BF) event; and/or
   triggering a beam failure recovery (BFR) from the physical layer to the medium access control layer; and/or
   performing the BFR.

3. The method of claim 1, wherein determining that the result of the monitoring indicates the failure comprises:
   receiving feedback or expecting feedback to be received from the radio access node;
   determining that the result of the monitoring indicates the failure based on the feedback being absent and/or based on the feedback indicating at least one of:
      a negative acknowledgment;
      a signal quality metric is less than a signal quality threshold, the signal quality metric comprising signal to noise ratio (SNR), signal to interference ratio (SIR), or signal to interference and noise ratio (SINR); or
      a received power metric is less than a received power threshold, the received power metric comprising reference signal received power (RSRP), reference signal received quality (RSRQ), or a received signal strength indication (RSSI).

4. The method of claim 1, wherein the result of the monitoring that indicates the failure comprises:
   a number of failures of the contention-based protocol or of the listen-before talk protocol being greater than a failure threshold;
   a ratio of failures and successes of the contention-based protocol or of the listen-before talk protocol being greater than a failure ratio threshold;
   retransmissions of the transmission or the transmission attempt on the second physical channel reaching or exceeding a retransmission threshold in the absence of receiving a response from the radio access node; and/or
   the retransmissions of the transmission or the transmission attempt on the second physical channel reaching or exceeding a threshold time in the absence of receiving the response from the radio access node.

5. The method claim 4, wherein the control message comprises at least one of:
   a Radio Resource Control (RRC) signal from the radio access node;
   a Control Element of Medium Access Control (MAC CE) from the radio access node;
   a Downlink Control Information (DCI) from the radio access node, wherein a DCI format is implicitly indicative of the spatial relation;
   a command for switching a Transmission Configuration Indication (TCI) state and/or an indicator of an active TCI state, wherein the active TCI state is implicitly indicative of the spatial relation; or
   a channel resource identifier that is indicative of the second physical channel and a Spatial Relation Information (SRI) field that is indicative of the first physical channel being spatially related to the second physical channel.

6. The method claim 5, wherein:
   the first physical channel is a downlink (DL) channel from the radio access node to the radio device or comprises at least one of:
      a Channel State Information Reference Signal (CSI-RS);
      a Synchronization Signal (SS);
      a Synchronization Signal Block (SSB);
      a Physical Broadcast Channel (PBCH);
      a Sounding Reference Signal (SRS);

the second physical channel is an uplink (UL) channel from the radio device to the radio access node and/or comprises at least one of:
a Physical Uplink Shared Channel (PUSCH);
a Physical Uplink Control Channel (PUCCH);
a Sounding Reference Signal (SRS);
a Random Access Preamble (RAP);
a Random Access Channel (RACH).

7. The method claim 6, further comprising communicating with the radio access node on the first physical channel using the filter in the spatial domain, wherein using the filter in the spatial domain comprises:
using the filter in the spatial domain according to the spatial relation; and
using the same precoder and/or the same beamforming weights for the communicating on the first physical channel and for the transmission or transmission attempt on the second physical channel.

8. The method of claim 7, further comprising:
incrementing a beam failure instance counter responsive to a failure of the communicating on the first physical channel and/or responsive to a failure of the transmission or the transmission attempt on the second physical channel; and
triggering a BFR responsive to the beam failure instance counter reaching or exceeding a beam failure threshold.

9. The method of claim 8, wherein responsive to the result of the monitoring indicating the failure of the transmission or the transmission attempt, performing the BFD comprises at least one of:
performing or triggering the BFR;
transmitting a report indicative of the BF to the radio access node;
storing a report indicative of the BF and transmitting the stored report after the BFR to the RAN or the radio access node, the report being indicative of at least one of:
a failure event caused by consecutive BF instances or beam misalignment instances in DL receptions or in UL transmissions;
a ratio of BF instances or beam misalignment instances in DL receptions and in UL transmissions;
a number of BF instances or beam misalignment instances.

10. The method of claim 9, wherein the report is further indicative of one or more candidate beams preferred by the radio device and indices of at least one of:
SSBs or SSB groups;
CSI-RS resources associated with the one or more candidate beams;
SRS resources associated with the one or more candidate beams;
TCI states associated with the one or more candidate beams;
the radio beam, the second physical channel, or the combination of the filter in the spatial domain and the second physical channel detected by the BFD;
one or more radio beams, radio physical channels, or combinations of the filter in the spatial domain and a physical channel for not detected by the BFD.

11. The method of claim 1, wherein the radio device is a user equipment (UE) configured to radio access the radio access node in at least one cell of the RAN and/or the radio access node is a radio base station is configured to provide radio access to the radio device in the at least one cell of the RAN.

12. The method of claim 7, wherein:
using the filter comprises applying beamforming weights to antenna elements of an antenna array comprising a plurality of the antenna elements;
at least one of or both the first physical channel and the second physical channel are in a frequency range above 50 GHz and/or in mm-wave bands; and/or
the monitored transmission or transmission attempt is based on a periodic or semi-persistent configuration received from the radio access node.

13. A method performed by a radio access node, the method comprising:
transmitting a control message on a radio access network (RAN), the control message indicating a spatial relation between a first physical channel and a second physical channel;
monitoring a reception or a reception attempt from a radio device on the second physical channel, the reception or reception attempt using a filter in a spatial domain configured for the first physical channel according to the spatial relation;
determining that a result of the monitoring indicates a failure of the reception or reception attempt by indicating:
interference and/or congestion on the second physical channel; or
that a contention-based protocol or a listen-before talk protocol has failed or indicates that the second physical channel is occupied, wherein the reception or reception attempt on the second physical channel comprises the contention-based protocol or the listen-before talk protocol; and
supporting Beam Failure Detection (BFD) for a radio beam between the radio device and the radio access node based on the result of the monitoring.

14. The method of claim 13, wherein responsive to the result of the monitoring indicating a failure of the reception or the reception attempt, performing the BFD comprises:
indicating, from a physical layer to a medium access control layer in a protocol stake of the radio device, a beam failure (BF) event; and/or
triggering a beam failure recovery (BFR) from the physical layer to the medium access control layer; and/or
performing the BFR.

15. The method of claim 13, wherein determining that the result of the monitoring indicates the failure comprises:
receiving feedback or expecting feedback to be received from the radio access node;
determining that the result of the monitoring indicates the failure based on the feedback being absent and/or based on the feedback indicating at least one of:
a negative acknowledgment;
a signal quality metric is less than a signal quality threshold, the signal quality metric comprising signal to noise ratio (SNR), signal to interference ratio (SIR), or signal to interference and noise ratio (SINR); or
a received power metric is less than a received power threshold, the received power metric comprising reference signal received power (RSRP), reference signal received quality (RSRQ), or a received signal strength indication (RSSI).

16. The method of claim 13, wherein the result of the monitoring that indicates the failure comprises:
a number of failures of the contention-based protocol or of the listen-before talk protocol being greater than a failure threshold;

a ratio of failures and successes of the contention-based protocol or of the listen-before talk protocol being greater than a failure ratio threshold;

retransmissions of the transmission or the transmission attempt on the second physical channel reaching or exceeding a retransmission threshold in the absence of receiving a response from the radio access node; and/or the retransmissions of the transmission or the transmission attempt on the second physical channel reaching or exceeding a threshold time in the absence of receiving the response from the radio access node.

17. The method of claim 16, wherein the control message comprises at least one of:

a Radio Resource Control (RRC) signal from the radio access node;

a Control Element of Medium Access Control (MAC CE) from the radio access node;

a Downlink Control Information (DCI) from the radio access node, wherein a DCI format is implicitly indicative of the spatial relation;

a command for switching a Transmission Configuration Indication (TCI) state and/or an indicator of an active TCI state, wherein the active TCI state is implicitly indicative of the spatial relation; or a channel resource identifier that is indicative of the second physical channel and a Spatial Relation Information (SRI) field that is indicative of the first physical channel being spatially related to the second physical channel.

18. The method of claim 17, wherein:

the first physical channel is a downlink (DL) channel from the radio access node to the radio device or comprises at least one of:

a Channel State Information Reference Signal (CSI-RS);

a Synchronization Signal (SS);

a Synchronization Signal Block (SSB);

a Physical Broadcast Channel (PBCH);

a Sounding Reference Signal (SRS);

the second physical channel is an uplink (UL) channel from the radio device to the radio access node and/or comprises at least one of:

a Physical Uplink Shared Channel (PUSCH);

a Physical Uplink Control Channel (PUCCH);

a Sounding Reference Signal (SRS);

a Random Access Preamble (RAP);

a Random Access Channel (RACH).

19. The method of claim 18, further comprising communicating with the radio device on the first physical channel using the filter in the spatial domain, wherein using the filter in the spatial domain comprises:

using the filter in the spatial domain according to the spatial relation; and using the same precoder and/or the same beamforming weights for the communicating on the first physical channel and for the reception or reception attempt on the second physical channel.

20. The method of claim 19, further comprising:

incrementing a beam failure instance counter responsive to a failure of the communicating on the first physical channel and/or responsive to a failure of the reception or reception attempt on the second physical channel; and triggering a BFR responsive to the beam failure instance counter reaching or exceeding a beam failure threshold.

21. The method of claim 20, performing or triggering the BFR;

transmitting a report indicative of the BF to the radio device;

storing a report indicative of the BF and transmitting the stored report after the BFR to the RAN or the radio access node, the report being indicative of at least one of:

a failure event caused by consecutive BF instances or beam misalignment instances in DL receptions or in UL transmissions;

a ratio of BF instances or beam misalignment instances in DL receptions and in UL transmissions;

a number of BF instances or beam misalignment instances.

22. The method of claim 21, wherein the report is further indicative of one or more candidate beams preferred by the radio device and indices of at least one of:

SSBs or SSB groups;

CSI-RS resources associated with the one or more candidate beams;

SRS resources associated with the one or more candidate beams;

TCI states associated with the one or more candidate beams;

the radio beam, the second physical channel, or the combination of the filter in the spatial domain and the second physical channel detected by the BFD;

one or more radio beams, radio physical channels, or combinations of the filter in the spatial domain and a physical channel for not detected by the BFD.

23. The method of claim 13, wherein the radio access node is a radio base station is configured to provide radio access to the radio device in the at least one cell of the RAN and/or the radio device is a user equipment (UE) configured to radio access the radio access node in at least one cell of the RAN.

24. The method of claim 13, wherein:

using the filter comprises applying beamforming weights to antenna elements of an antenna array comprising a plurality of the antenna elements;

at least one of or both the first physical channel and the second physical channel are in a frequency range above 50 GHz and/or in mm-wave bands; and/or the monitored transmission or transmission attempt is based on a periodic or semi-persistent configuration received from the radio access node.

25. A radio device, comprising:

processing circuitry and memory comprising instructions executable by the processing circuitry whereby a network node is configured to:

receive a control message from a radio access network (RAN), the control message indicating a spatial relation between a first physical channel and a second physical channel;

monitor a transmission or transmission attempt to a radio access node on the second physical channel, the transmission or transmission attempt using a filter in the spatial domain configured for the first physical channel according to the spatial relation;

determine that a result of the monitoring indicates a failure of the transmission or transmission attempt by indicating:

interference and/or congestion on the second physical channel; or that a contention-based protocol or a listen-before talk protocol has failed or indicates that the second physical channel is occupied, wherein the transmission or transmission attempt on the second physical channel comprises the contention-based protocol or the listen-before talk protocol; and perform Beam Failure Detection (BFD) for a radio beam between the radio device and the radio access node based on the result of the monitoring.

26. A network node comprising:

processing circuitry and memory comprising instructions executable by the processing circuitry whereby the network node is configured to:

transmit a control message from a radio access network (RAN), the control message indicating a spatial relation between a first physical channel and a second physical channel;

monitor a reception or a reception attempt from a radio device on the second physical channel, the reception or reception attempt using a filter in a spatial domain configured for the first physical channel according to the spatial relation;

determine that a result of the monitoring indicates a failure of the reception or reception attempt by indicating:

interference and/or congestion on the second physical channel; or that a contention-based protocol or a listen-before talk protocol has failed or indicates that the second physical channel is occupied, wherein the transmission or transmission attempt on the second physical channel comprises the contention-based protocol or the listen-before talk protocol; and support Beam Failure Detection (BFD) for a radio beam between the radio device and the radio access node based on the result of the monitoring.

* * * * *